US012607957B2

(12) United States Patent
Yamashita

(10) Patent No.: US 12,607,957 B2
(45) Date of Patent: Apr. 21, 2026

(54) SUPPORT FOR ELECTROPHOTOGRAPHIC PHOTORECEPTOR, ELECTROPHOTOGRAPHIC PHOTORECEPTOR, PHOTORECEPTOR UNIT, PROCESS CARTRIDGE, AND IMAGE FORMING APPARATUS

(71) Applicant: FUJIFILM Business Innovation Corp., Tokyo (JP)

(72) Inventor: Takayuki Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 475 days.

(21) Appl. No.: 18/161,101

(22) Filed: Jan. 30, 2023

(65) Prior Publication Data

US 2023/0288825 A1 Sep. 14, 2023

(30) Foreign Application Priority Data

Mar. 11, 2022 (JP) ................................ 2022-038629

(51) Int. Cl.
*G03G 15/00* (2006.01)
*G03G 5/10* (2006.01)

(52) U.S. Cl.
CPC ............ *G03G 15/75* (2013.01); *G03G 5/102* (2013.01)

(58) Field of Classification Search
CPC ...... G03G 15/75; G03G 15/754; G03G 5/102; G03G 15/751
See application file for complete search history.

(56) References Cited

U.S. PATENT DOCUMENTS

| | | | | |
|---|---|---|---|---|
| 5,783,344 | A * | 7/1998 | Kobayashi | G03G 5/144 430/65 |
| 8,725,036 | B2 | 5/2014 | Yamashita et al. | |
| 2008/0056763 | A1* | 3/2008 | Nishimura | G03G 15/751 399/159 |
| 2010/0092883 | A1* | 4/2010 | Wu | G03G 15/751 430/59.5 |
| 2016/0223925 | A1* | 8/2016 | Tamemasa | G03G 5/102 |
| 2020/0131683 | A1* | 4/2020 | Kim | D06F 37/245 |

FOREIGN PATENT DOCUMENTS

| | | |
|---|---|---|
| JP | 2002351109 | 12/2002 |
| JP | 2006215347 | 8/2006 |
| JP | 2008070789 | 3/2008 |
| JP | 2012103473 | 5/2012 |
| JP | 2012255933 | 12/2012 |
| JP | 5818521 | 11/2015 |
| JP | 2017161795 | 9/2017 |

OTHER PUBLICATIONS

"Notice of Reasons for Refusal of Japan Counterpart Application", issued on Dec. 9, 2025, with English translation thereof, p. 1-p. 6.

* cited by examiner

*Primary Examiner* — Sandra Brase
(74) *Attorney, Agent, or Firm* — JCIPRNET

(57) ABSTRACT

A support for an electrophotographic photoreceptor includes a cylindrical body having an inner diameter at each of both end parts in an axial direction larger than an inner diameter at a central part in the axial direction, the cylindrical body having a stepped part between the inner diameter at each of the both end parts in the axial direction and the inner diameter at the central part in the axial direction, wherein a coaxiality C between an outer diameter of the cylindrical body and the inner diameter at the central part in the axial direction is 0.3 mm or less.

18 Claims, 5 Drawing Sheets

SUPPORT FOR ELECTROPHOTOGRAPHIC PHOTORECEPTOR, ELECTROPHOTOGRAPHIC PHOTORECEPTOR, PHOTORECEPTOR UNIT, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-038629 filed Mar. 11, 2022.

BACKGROUND

(i) Technical Field

The present invention relates to a support for an electrophotographic photoreceptor, an electrophotographic photoreceptor, a photoreceptor unit, a process cartridge, and an image forming apparatus.

(ii) Related Art

JP2012-255933A discloses an electrophotographic apparatus including an electrophotographic photoreceptor unit and a rotary drive mechanism, the electrophotographic photoreceptor unit including a cylindrical electrophotographic photoreceptor, and first and second bearings for rotatably supporting both ends of the electrophotographic photoreceptor in the electrophotographic apparatus, the rotary drive mechanism including an output gear for outputting a rotary drive force for rotating the electrophotographic photoreceptor in the electrophotographic apparatus, wherein the electrophotographic photoreceptor unit further includes an input gear capable of meshing with the output gear, the electrophotographic photoreceptor includes a cylindrical base, a photoconductive layer composed of amorphous silicon on the base, and first and second flanges fitted to both ends of the base, the first bearing is attached to the first flange, the second bearing is attached to the second flange, the input gear is not attached to the first flange, the input gear is attached to only the second flange, and a position of a gravity center in a longitudinal direction of the electrophotographic photoreceptor unit is located on the second bearing side from a center in the longitudinal direction of the electrophotographic photoreceptor unit.

JP2002-351109A discloses a photoreceptor drum for electrophotography used in a digital laser printer/copier or the like having resolutions of 1200 dpi or more, the drum including an organic photosensitive layer on a cylindrical conductive base, wherein the cylindrical conductive base has a thickness of 2.5 mm or more.

JP2006-215347A discloses a method for manufacturing an electrophotographic photoreceptor drum unit, the drum unit including at least an electrophotographic photoreceptor drum and an engaging member having a shaft, the method including coupling the engaging member to the electrophotographic photoreceptor drum, thereafter measuring a rotational weight imbalance amount to set a dynamic eccentric distance in the coupled shaft to 25 μm or less, and rotating the electrophotographic photoreceptor drum coupled to the engaging member to process the shaft of the coupled engaging member into a homothetic circle about a center axis with respect to an outer circumference of the electrophotographic photoreceptor drum.

SUMMARY

Aspects of non-limiting embodiments of the present disclosure relate to a support for an electrophotographic photoreceptor used for an electrophotographic photoreceptor having a long length and a large area, the support including a cylindrical body in which an inner diameter at each of both end parts in an axial direction is larger than an inner diameter at a central part in the axial direction, and in which a stepped part provides between the inner diameter at each of the both end parts in the axial direction and the inner diameter at the central part in the axial direction, wherein the electrophotographic photoreceptor can be obtained so as to be capable of forming an image with reduced color unevenness as compared with a case where a coaxiality C between an outer diameter of the cylindrical body and the inner diameter at the central part in the axial direction is more than 0.3 mm can be obtained.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a support for an electrophotographic photoreceptor including: a cylindrical body in which an inner diameter at each of both end parts in an axial direction larger than an inner diameter at a central part in the axial direction, and in which a stepped part is provided between the inner diameter at each of the both end parts in the axial direction and the inner diameter at the central part in the axial direction, wherein a coaxiality C between an outer diameter of the cylindrical body and the inner diameter at the central part in the axial direction is 0.3 mm or less.

DETAILED DESCRIPTION

Figure 1:
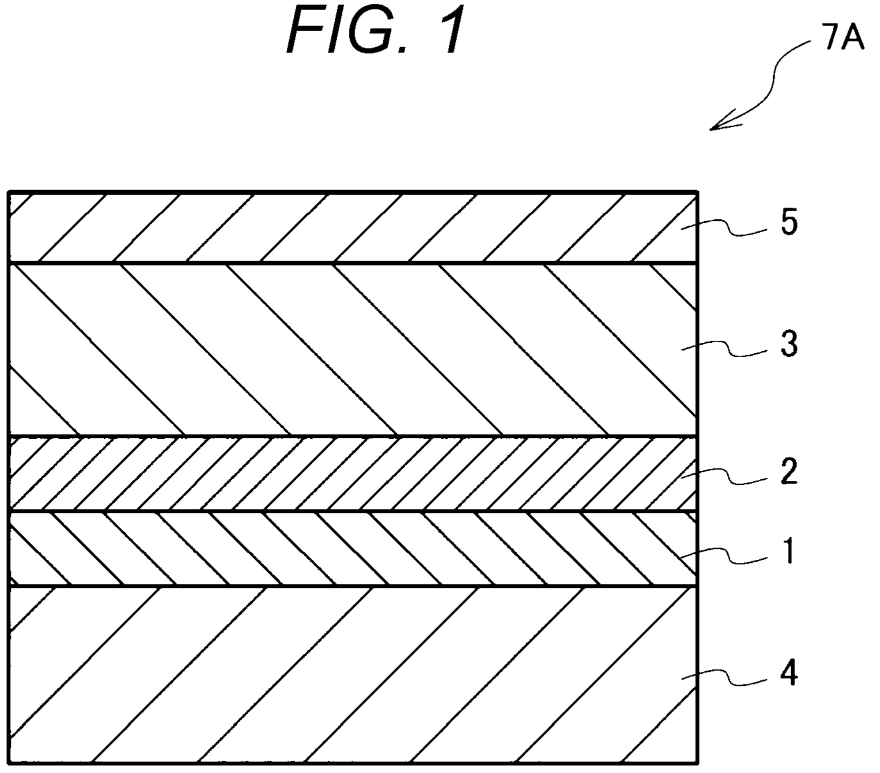
FIG. 1 is a schematic and partial sectional view illustrating an example of a configuration of a photoreceptor according to an exemplary embodiment.

Hereinafter, exemplary embodiments of the present disclosure will be described. These descriptions and examples are provided to illustrate the exemplary embodiments but are not intended to limit the scope of the exemplary embodiments.

The numerical ranges expressed by using "to" in the present disclosure denote ranges including each of numerical values described before and after "to" as a minimum value and a maximum value.

An upper limit or a lower limit of one numerical range in stepwise numerical ranges in the present disclosure may be replaced with an upper limit or a lower limit of another stepwise numerical range. The upper limit or the lower limit of any numerical range described in the present disclosure may be replaced with a value described in examples.

In the present disclosure, the term "step" includes not only an independent step but also a step that cannot be clearly distinguished from other steps as long as the purpose of the step is achieved.

When an exemplary embodiment is described with reference to the drawings in the present disclosure, the structure of the exemplary embodiment is not limited to the structure illustrated in the drawings. The sizes of the members in each drawing are conceptual sizes, and the relative relation in the size between the sizes of the members is not limited thereto.

In the present disclosure, each component may contain a plurality of corresponding substances. In the present disclosure, the amount of each component in a composition refers to, when there are a plurality of kinds of substances corresponding to each component in the composition, the total amount of the plurality of kinds of substances present in the composition unless otherwise specified.

<Support for Electrophotographic Photoreceptor>

A support for an electrophotographic photoreceptor according to an exemplary embodiment includes a cylindrical body having an inner diameter at each of both end parts in an axial direction larger than an inner diameter at a central part in the axial direction, the cylindrical body having a stepped part between the inner diameter at each of the both end parts in the axial direction and the inner diameter at the central part in the axial direction, wherein a coaxiality C between an outer diameter of the cylindrical body and the inner diameter at the central part in the axial direction is 0.3 mm or less.

Hereinafter, the support for an electrophotographic photoreceptor may be simply referred to as "support".

In recent years, electrophotographic photoreceptors having a long length and a large area have been required because of a demand for large scale printing having a size of B2 or more and an increase in output speed (also referred to as process speed). An electrophotographic photoreceptor including an electrophotographic photoreceptor having a long length and a large area typically includes a support formed of a cylindrical body having an inner diameter at each of both end parts in an axial direction larger than an inner diameter at a central part in the axial direction, and the cylindrical body includes a stepped part between the inner diameter at each of the both end parts in the axial direction and the inner diameter at the central part in the axial direction. The center of gravity of the support included in the electrophotographic photoreceptor (that is, the center of gravity of the cylindrical body) may affect, for example, color unevenness in an image.

It is considered that the color unevenness in the image due to the center of gravity of the support is caused by the following reason.

A support for an electrophotographic photoreceptor is typically obtained by, first, performing socket and spigot processing on a tube material at each of both end parts in an axial direction so that an inner diameter at each of the both end parts in the axial direction is larger than an inner diameter at a central part in the axial direction and a stepped part is provided between the inner diameter at each of the both end parts in the axial direction and the inner diameter at the central part in the axial direction, and then cutting the outer peripheral surface using the socket and spigot processed part as a reference surface. Thus, an occurrence of a deviation in the socket and spigot processed part relative to the inner diameter of the tube material, the deviation being formed when the tube material is subjected to socket and spigot processing, causes the support to have a difference in thickness in a circumferential direction after the outer peripheral surface is cut using the socket and spigot processed part as a reference surface. It is considered that image formation with an electrophotographic photoreceptor including a support having a difference in thickness in a circumferential direction causes the center of gravity of the support to shift from the center of the rotation axis of the electrophotographic photoreceptor, and vibrations are generated, which results in a formation of color unevenness in an image to be formed.

It is noted that to obtain a high-quality image with an electrophotographic photoreceptor having a long length and a large area, it is desirable to have a support with an increased dimensional accuracy and shape accuracy. To have a support with an increased dimensional accuracy and shape accuracy, the thickness of the support is increased (for example, the thickness is set to 2 mm or more) to facilitate processing. The more increased the thickness of the support is, the more increased the mass of the support is, and thus, it is considered that the difference in thickness in a circumferential direction as described above tends to increase vibrations in the above-described image formation, which results in remarkably generating color unevenness in an image.

In contrast, the support according to the exemplary embodiment includes a cylindrical body having an inner diameter at each of both end parts in an axial direction larger than an inner diameter at a central part in the axial direction, the cylindrical body having a stepped part between the inner diameter at each of the both end parts in the axial direction and the inner diameter at the central part in the axial direction, wherein a coaxiality C between an outer diameter of the cylindrical body and the inner diameter at the central part in the axial direction is 0.3 mm or less.

A support achieving such a coaxiality C can provide an electrophotographic photoreceptor capable of forming an image with reduced color unevenness even when the support is used for an electrophotographic photoreceptor having a long length and a large area, and more preferably, even when the support has a large thickness (for example, 2 mm or more). It is noted that the stepped part, which is included in the cylindrical body of the support where the inner diameter at each of the both end parts in the axial is larger than the inner diameter at the central part in the axial direction and is provided between the inner diameter at each of the both end parts in the axial direction and the inner diameter at the central part in the axial direction, is formed by socket and spigot processing as described above, and therefore, such stepped part is also referred to as "socket and spigot processed part".

[Coaxiality C]

In the exemplary embodiment, the coaxiality C is measured as follows.

For the cylindrical body (support) to be measured, the coaxiality between the outer diameter and the inner diameter of the central part in the axial direction (specifically, the inner diameter of a part inward from the socket and spigot processed part in the axial direction) is measured.

The measurement points are two points (R and L) each having a distance of 25 mm from an end surface of the support (or 10 mm inward from the socket and spigot processed part). When values CR and CL of the coaxiality measured at the two points are both 0.3 mm (300 μm) or less, it is assumed that the coaxiality C is 0.3 mm or less.

As a measurement device, RONDCOM 60-A manufactured by TOKYO SEIMITSU CO., LTD. was used. The measurement conditions are magnification: 200 times, measurement speed: (rotation) 6 mm/see, filter: digital filter, and 2RC operation: LSC least squares center method.

It is note that when the measurement is performed on a support in which a layer such as a photosensitive layer is formed on at least a part of the outer peripheral surface of the support, the measurement is performed after the layer is chemically or physically removed.

The coaxiality C is 0.3 mm or less, and an electrophotographic photoreceptor capable of forming an image with further reduced color unevenness is obtained as the value of the coaxiality becomes smaller. From the viewpoint of obtaining an electrophotographic photoreceptor capable of forming an image with further less color unevenness, the coaxiality is preferably 0.2 mm or less, more preferably 0.15 mm or less, and still more preferably 0.1 mm or less.

The lower limit of the coaxiality C may be 0 mm, but it is preferably more than 0 mm from the viewpoint of production efficiency and from the viewpoint of obtaining an electrophotographic photoreceptor excellent in cleaning properties, and more preferably 0.005 mm or more from the viewpoint of obtaining an electrophotographic photoreceptor excellent in cleaning properties.

It is considered that with the coaxiality C having a lower limit of 0.005 mm or more, slight vibration are generated when the electrophotographic photoreceptor rotates in image formation. It is considered that the slight vibration make it easy to remove deposits such as toner at the contact part of the surface of the electrophotographic photoreceptor with a cleaning blade, make it difficult to deposit toner and the like at the contact part with the cleaning blade, and even when toner and the like are deposited, a stirring action in the deposits is generated, and only specific toner and external additives are prevented from remaining at the edge part of the cleaning blade, so that an electrophotographic photoreceptor excellent in cleaning properties can be obtained as compared with a case where the coaxiality C is less than 0.005 mm.

The value of the coaxiality C is adjusted by the accuracy of socket and spigot processing relative to the tube material.

[Difference ΔC in Coaxiality]

In the support according to the exemplary embodiment, the difference AC in coaxiality between both ends of the cylindrical body in the axial direction is preferably 0.2 mm or less, more preferably 0.1 mm or less, and still more preferably 0.05 mm or less from the viewpoint of obtaining an electrophotographic photoreceptor capable of forming an image with reduced fine line misalignment.

The difference AC in coaxiality between both ends of the cylindrical body in the axial direction refers to a difference (absolute value) between the values CR and CL of the coaxiality obtained by the measurement method described above.

When the difference AC in coaxiality is 0.2 mm or less, an electrophotographic photoreceptor capable of forming an image with reduced color unevenness and reduced fine line misalignment is obtained. In particular, in a case of a long support having a total length (that is, the length in the axial direction) of 490 mm or more, a large difference AC in coaxiality between the both ends of the cylindrical body in the axial direction causes an imbalance at both ends of the electrophotographic photoreceptor in the axial direction, and fine line misalignment is likely to occur in an image. Thus, by setting the difference AC in coaxiality to 0.2 mm or less, an electrophotographic photoreceptor capable of forming an image with reduced fine line misalignment can be obtained even in a case if having a long support with a total length (that is, the length in the axial direction) of 490 mm or more.

The lower limit of the difference AC in coaxiality may be 0 mm, may be more than 0 mm, or may be 0.001 μm or more.

The value of the difference AC in coaxiality is adjusted by the accuracy of socket and spigot processing performed on the tube material.

In the support according to the exemplary embodiment, it is preferable that the coaxiality C be 0.2 mm or less and the difference AC in coaxiality be 0.05 mm or less from the viewpoint of obtaining an electrophotographic photoreceptor capable of forming an image with further reduced color unevenness and fine line misalignment.

The lower limit of the coaxiality C may be 0 mm, may be more than 0 mm, or may be 0.005 mm or more. The lower limit of the difference AC in coaxiality may be 0 mm, may be more than 0 mm, or may be 0.001 mm or more.

[Size of Support (Cylindrical Body)]

The cylindrical body as the support according to the exemplary embodiment preferably has an outer diameter of 80 mm or more, a total length of 1,200 mm or less, and a thickness of 2 mm or more.

An electrophotographic photoreceptor capable of forming an image with reduced color unevenness is obtained with the support according to the exemplary embodiment having the size described above.

The outer diameter of the cylindrical body is preferably 80 mm or more and 300 mm or less, and more preferably 82 mm or more and 280 mm or less.

The total length (the length in the axial direction) of the cylindrical body is preferably 490 mm or more and 1,200 mm or less, and more preferably 500 mm or more and 1,000 mm or less.

The thickness of the cylindrical body is preferably 2 mm or more and 7 mm or less, and more preferably 3 mm or more and 5 mm or less.

The thickness of the cylindrical body refers to the thickness on the inner side in the axial direction from the socket and spigot processed part (the region subjected to socket and spigot processing).

Hereinafter, the support according to the exemplary embodiment will be described in detail.

Examples of the material constituting the support (cylindrical body) include metals, and specific examples thereof include: a pure metal such as aluminum, iron, or copper; and an alloy such as stainless steel or an aluminum alloy.

The metal constituting the support is preferably a metal containing aluminum, and more preferably pure aluminum or an aluminum alloy from the viewpoint of being light and excellent in processability. The aluminum alloy is not limited as long as it is an alloy containing aluminum as a main component, and examples thereof include an aluminum alloy containing Si, Fc, Cu, Mn, Mg, Cr, Zn, Ti or the like in addition to aluminum. The term “main component” refers to an element having the highest content ratio (on a mass basis) among the elements contained in the alloy.

The support is not limited to particular shapes as long as it has a cylindrical shape as described above.

It is preferable that the support be a conductive support. The term "conductive" means that the volumetric resistivity is less than $10^{13}$ Ωcm.

[Method for Producing Support]

Hereinafter, an example of a method for producing the support will be described.

First, for example, an aluminum alloy (JIS A 6063 alloy) solid is extruded with an extruder, and the aluminum alloy extruded by the extruder is drawn with a drawing device to produce a tube material.

Then, each end of the obtained tube material is subjected to socket and spigot process (also referred to as "boring cutting"), and the inner peripheral surface of the tube material is cut, so that the inner diameter at each of both end parts in an axial direction is larger than the inner diameter at a central part in the axial direction, and a stepped part is formed between the inner diameter at each of the both end parts in the axial direction and the inner diameter at the central part in the axial direction. Specifically, for example, the inner peripheral surface of the tube material is cut by rotating the tube material around the axis of the tube material, starting to cut the inner peripheral surface of the tube material from an end using a cutting tool, and moving the cutting tool inward in the axial direction of the tube material by a desired distance.

Subsequently, the outer peripheral surface of the tube material subjected to socket and spigot processing is cut. Specifically, for example, the outer peripheral surface of the tube material is cut from one end to the other end in the axial direction while rotating the tube material around the axis together with a holding jig in a state where the holding jig is in contact with the inner peripheral surface of the tube material at each end in the axial direction to hold the tube material.

The support according to the exemplary embodiment is produced in this manner.

There are no particular limitations on the devices, conditions, and the like used for the socket and spigot processing on the tube material as long as the intended processing can be performed, and known devices, conditions, and the like may be selected.

There are no particular limitations either on the devices, conditions, and the like used for cutting the outer peripheral surface of the tube material subjected to the socket and spigot processing as long as the intended cutting can be performed, and known devices, conditions, and the like may be selected.

The coaxially C, the difference ΔC in coaxially, and the like described above may be adjusted by controlling the positional relation between the cutting tool and the tube material (also referred to as work) at the time of fixing the work in the socket and spigot processing and cutting of the outer peripheral surface described above.

<Electrophotographic Photoreceptor>

An electrophotographic photoreceptor according to an exemplary embodiment includes a conductive support, which is the support according to the exemplary embodiment, and a photosensitive layer provided on the support.

FIG. 1 is a schematic sectional view illustrating an example of a layer configuration of an electrophotographic photoreceptor 7A. The electrophotographic photoreceptor 7A illustrated in FIG. 1 has a structure in which an undercoat layer 1, a charge generating layer 2, and a charge transport layer 3 are stacked in this order on a conductive support 4. The charge generating layer 2 and the charge transport layer 3 constitute a photosensitive layer 5.

Figure 2:
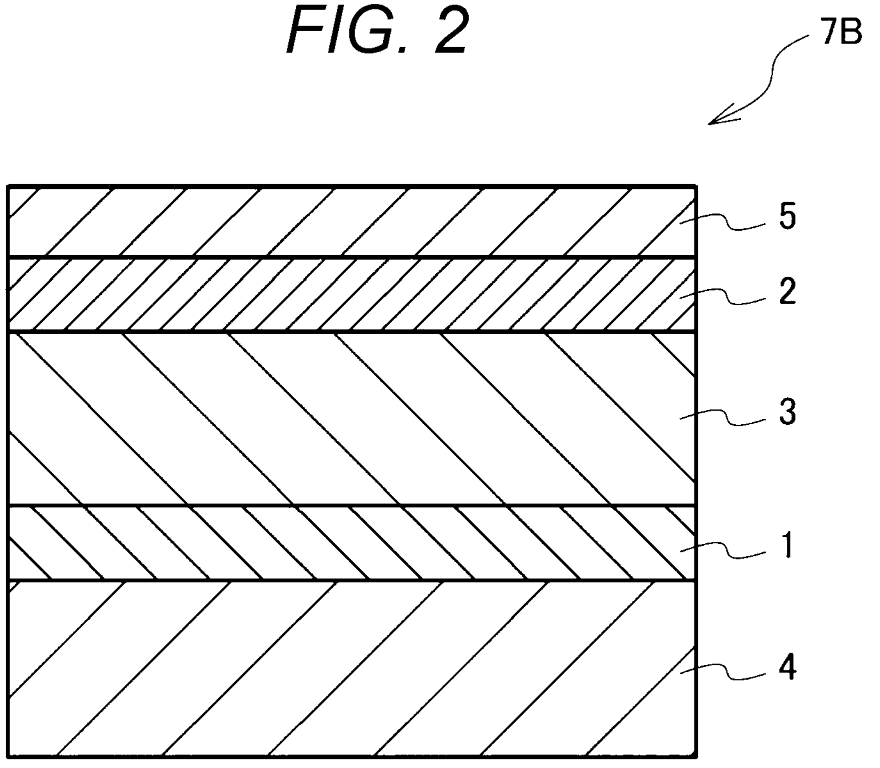
FIG. 2 is a schematic and partial sectional view illustrating another configuration example of the photoreceptor according to the exemplary embodiment.
Figure 3:
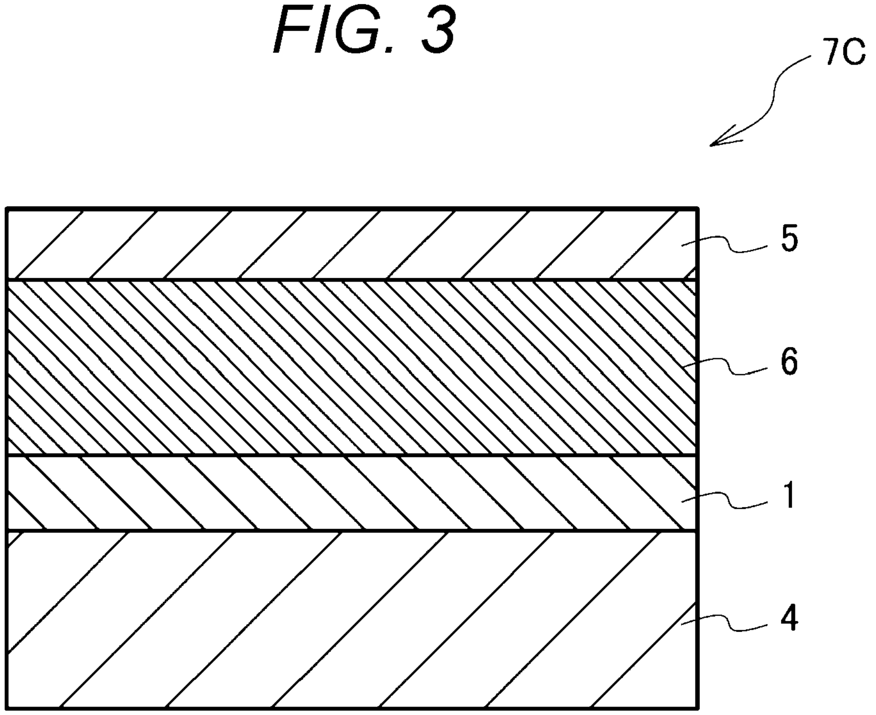
FIG. 3 is a schematic and partial sectional view illustrating another configuration example of the photoreceptor according to the exemplary embodiment.

FIGS. 2 and 3 are schematic sectional views each illustrating another example of the layer configuration of the electrophotographic photoreceptor according to the exemplary embodiment.

Similar to the electrophotographic photoreceptor 7A illustrated in FIG. 1, the electrophotographic photoreceptors 7B and 7C illustrated in FIGS. 2 and 3 include the photosensitive layer 5 in which functions are separated into the charge generating layer 2 and the charge transport layer 3, and a protection layer 6 is formed as an outermost layer. The electrophotographic photoreceptor 7B illustrated in FIG. 2 has a structure in which the undercoat layer 1, the charge generating layer 2, the charge transport layer 3, and the protection layer 6 are stacked in this order on the conductive support 4. The electrophotographic photoreceptor 7C illustrated in FIG. 3 has a structure in which the undercoat layer 1, the charge transport layer 3, the charge generating layer 2, and the protection layer 6 are stacked in this order on the conductive support 4.

The undercoat layer 1 does not have to be provided in each of the electrophotographic photoreceptors 7A to 7C. Each of the electrophotographic photoreceptors 7A to 7C may be a single-layer type photosensitive layer in which the functions of the charge generating layer 2 and the charge transport layer 3 are integrated.

Hereinafter, each layer of the electrophotographic photoreceptor will be described in detail. The references are omitted in the description.

(Undercoat Layer)

The undercoat layer is, for example, a layer containing inorganic particles and a binder resin.

Examples of the inorganic particles include inorganic particles having a powder resistivity (volume resistivity) of $10^2$ Ωcm or more and $10^{11}$ Ωcm or less. Among them, as the inorganic particles having the above resistance value, for example, metal oxide particles such as tin oxide particles, titanium oxide particles, zinc oxide particles, and zirconium oxide particles are preferable, and zinc oxide particles are particularly preferable.

The BET specific surface area of the inorganic particles may be, for example, 10 $m^2/g$ or more.

The volume average particle diameter of the inorganic particles may be, for example, 50 nm or more and 2,000 or less (preferably 60 nm or more and 1,000 nm or less).

The content of the inorganic particles is, for example, preferably 10 mass % or more and 80 mass % or less, and more preferably 40 mass % or more and 80 mass % or less relative to the binder resin.

The inorganic particles may be subjected to surface treatment. Two or more types of inorganic particles having different surface treatments or different particle diameters may be mixed and used.

Examples of the surface treatment agent include a silane coupling agent, a titanate coupling agent, an aluminum coupling agent, and a surfactant. In particular, silane coupling agents are preferable, and a silane coupling agent having an amino group is more preferable.

Examples of the silane coupling agent having an amino group include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltricthoxysilane.

Two or more types of silane coupling agents may be used as a mixture. For example, a silane coupling agent having an amino group and another silane coupling agent may be used in combination. Examples of other silane coupling agents include, but are not limited to, vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltricthoxysilane, and 3-chloropropyltrimethoxysilane.

The surface treatment method with a surface treatment agent may be any known method, and either a dry method or a wet method may be used.

The amount of the surface treatment agent used in the treatment may be 0.5 mass % or more and 10 mass % or less relative to the inorganic particles.

The undercoat layer preferably contains an electron-accepting compound (acceptor compound) together with the inorganic particles from the viewpoint of improving the long-term stability of electrical characteristics and a carrier blocking property.

Examples of the electron-accepting compound include electron transport substances such as: quinone compounds, for example chloranil and bromoanil; tetracyanoquinodimethane compounds; fluorenone compounds such as 2,4,7-trinitrofluorenone, and 2,4,5,7-tetranitro-9-fluorenone; oxadiazole compounds such 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthone-based compounds; thiophene compounds; and diphenoquinone compounds such as 3,3',5,5'-tetra-t-butyl diphenoquinone.

In particular, a compound having an anthraquinone structure is preferable as the electron-accepting compound. As the compound having an anthraquinone structure, for example, a hydroxyanthraquinone compound, an aminoanthraquinone compound, an aminohydroxyanthraquinone compound, and the like are preferable, and specifically, for example, anthraquinone, alizarin, quinizarin, anthrarufin, purpurin, and the like are preferable.

The electron-accepting compound may be contained in a dispersed state in the undercoat layer together with the inorganic particles or may be contained in an attached state to the surfaces of the inorganic particles.

Examples of the method for attaching the electron-accepting compound to the surfaces of the inorganic particles include a dry method and a wet method.

The dry method is, for example, a method of attaching the electron-accepting compound to the surfaces of the inorganic particles by dropping or spraying together with dry air or nitrogen gas, the electron-accepting compound directly or in the form of a solution in an organic solvent while stirring the inorganic particles with a mixer or the like having a large shear force. The dropping or spraying of the electron-accepting compound may be performed at a temperature equal to or lower than the boiling point of the solvent. After the electron-accepting compound is dropped or sprayed, baking may be further performed at 100° C. or more. The baking is not limited as long as the temperature and time are determined so as to obtain electrophotographic characteristics.

The wet method is, for example, a method of attaching the electron-accepting compound to the surfaces of the inorganic particles by adding the electron-accepting compound while dispersing the inorganic particles in a solvent by, for example, stirring, ultrasonic waves, a sand mill, an attritor, a ball mill, or the like, stirring or dispersing the resulting mixture, and then removing the solvent. Examples of the method for removing the solvent include filtration and distillation. After the solvent is removed, baking may be further performed at 100° C. or more. The baking is not limited as long as the temperature and time are determined so as to obtain electrophotographic characteristics. In the wet method, moisture contained in the inorganic particles may be removed before the electron-accepting compound is added, and examples of the removal of moisture include removing moisture while stirring and heating in the solvent, and removing moisture by azeotropy with the solvent.

It is noted that the electron-accepting compound may be attached before, after or simultaneously with performing surface treatment on the inorganic particles with a surface treatment agent.

The content of the electron-accepting compound may be, for example, 0.01 mass % or more and 20 mass % or less, and preferably 0.01 mass % or more and 10 mass % or less relative to the inorganic particles.

Examples of the binder resin used in the undercoat layer include known materials such as: known polymer compounds, for example acetal resins (e.g., polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenol resins, phenol-formaldehyde resins, melamine resins, urethane resins, alkyd resins, and epoxy resins; zirconium chelate compounds; titanium chelate compounds; aluminum chelate compounds; titanium alkoxide compounds; organic titanium compounds; and silane coupling agents.

Examples of the binder resin used in the undercoat layer also include a charge transport resin having a charge transport group and a conductive resin (e.g., polyaniline).

Among them, a resin insoluble in a coating solvent of an upper layer is preferable as the binder resin used in the undercoat layer. In particular, preferred is a resin obtained by reaction of at least one resin with a curing agent, the at least one resin being selected from the group consisting of: thermosetting resins such as a urea resin, a phenol resin, a phenol-formaldehyde resin, a melamine resin, a urethane resin, an unsaturated polyester resin, an alkyd resin, and an epoxy resin; polyamide resins; polyester resins; polyether resins; methacrylic resins; acrylic resins; polyvinyl alcohol resins; and polyvinyl acetal resins.

When two or more of these binder resins are used in combination, the mixing ratio is set according to the demand.

The undercoat layer may contain various additives for improving electrical characteristics, improving environmental stability, and improving image quality.

Examples of the additives include known materials such as polycyclic condensed- or azo-electron transport pigments, zirconium chelate compounds, titanium chelate compounds, aluminum chelate compounds, titanium alkoxide compounds, organic titanium compounds, and silane coupling agents. The silane coupling agent is used for the surface treatment of the inorganic particles as described above and may be further added as an additive to the undercoat layer.

Examples of the silane coupling agent as an additive include vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compound include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxytitanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or as a mixture or polycondensate of plural compounds.

The undercoat layer preferably has a Vickers hardness of 35 or more.

To prevent moire fringes, the undercoat layer preferably has a surface roughness (ten-point average roughness) of 1/(4n) (n is the refractive index of an upper layer) to 1/2 of the wavelength λ of an exposure laser used.

Resin particles or the like may be added to the undercoat layer to adjust the surface roughness. Examples of the resin particles include silicone resin particles and cross-linked polymethyl methacrylate resin particles. The surface of the undercoat layer may be polished to adjust the surface roughness. Examples of the polishing method include buff polishing, sand blast treatment, wet honing, and grinding.

A method for forming the undercoat layer is not limited, and a known forming method is used. For example, a coating film of a coating solution for forming the undercoat layer, which is prepared by adding the components described above to a solvent, is formed, dried, and as necessary, heated.

Examples of the solvent for preparing the coating solution for forming the undercoat layer include known organic solvents, such as alcohol solvents, aromatic hydrocarbon solvents, halogenated hydrocarbon solvents, ketone solvents, ketone alcohol solvents, ether solvents, and ester solvents.

Specific examples of these solvents include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method for dispersing the inorganic particles in preparing the coating solution for forming the undercoat layer include known methods which involve using a roll mill, a ball mill, a vibratory ball mill, an attritor, a sand mill, a colloid mill, or a paint shaker.

Examples of the method for applying the coating solution for forming the undercoat layer to the support include a common method such as a blade coating method, a wire-bar coating method, a spray coating method, a dip coating method, a ring coating method, a bead coating method, an air knife coating method, or a curtain coating method.

The thickness of the undercoat layer is set, for example, preferably in the range of 15 μm or more, and more preferably in the range of 20 μm or more and 50 μm or less.

(Intermediate Layer)

Although not illustrated, an intermediate layer may be further provided between the undercoat layer and the photosensitive layer.

The intermediate layer is, for example, a layer containing a resin. Examples of the resin used in the intermediate layer include polymer compounds such as acetal resins (e.g., polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may be a layer containing an organic metal compound. Examples of the organic metal compound used in the intermediate layer include organic metal compounds containing a metal atom such as a zirconium atom, a titanium atom, an aluminum atom, a manganese atom, or a silicon atom.

These compounds used in the intermediate layer may be used alone or as a mixture or polycondensate of plural compounds.

Among them, the intermediate layer is preferably a layer containing an organic metal compound containing a zirconium atom or a silicon atom.

A method for forming the intermediate layer is not limited, and a known formation method is used. For example, a coating film of a coating solution for forming the intermediate layer, which is prepared by adding the components described above to a solvent, is formed, dried, and as necessary, heated.

Examples of the coating method for forming the intermediate layer include a common method such as a dip coating method, a ring coating method, a push-up coating method, a wire bar coating method, a spray coating method, a blade coating method, a knife coating method, or a curtain coating method.

The film thickness of the intermediate layer is, for example, preferably set within a range of 0.1 μm or more and 3 μm or less. The intermediate layer may be used as the undercoat layer.

(Charge Generating Layer)

The charge generating layer is, for example, a layer containing a charge generating material and a binder resin. The charge generating layer may be a vapor-deposited layer of a charge generating material. The vapor-deposited layer of a charge generating material is suitable for the use of an incoherent light source such as a light emitting diode (LED) or an organic electro-luminescence (EL) image array.

Examples of the charge generating material include: azo pigments such as bisazo or trisazo pigments; condensed-ring aromatic pigments such as dibromoanthanthrone; perylene pigments; pyrrolopyrrole pigments; phthalocyanine pigments; zinc oxide; and trigonal selenium.

Among them, a metal phthalocyanine pigment or a metal-free phthalocyanine pigment is preferably used as the charge generating material to correspond to laser exposure in a near-infrared region. Specifically, for example, hydroxygallium phthalocyanine; chlorogallium phthalocyanine; dichlorotin phthalocyanine; and titanyl phthalocyanine are more preferable.

On the other hand, to correspond to laser exposure in a near-ultraviolet region as the charge generating material, condensed-ring aromatic pigments such as dibromoanthanthrone; thioindigo pigments; porphyrazine compounds; zinc oxide; trigonal selenium; and bisazo pigments are preferable.

The charge generating materials described above may also be used when an incoherent light source such as an LED or an organic EL image array having an emission center wavelength of 450 nm or more and 780 nm or less is used. However, from the viewpoint of resolution, when the photosensitive layer is used in the form of a thin film having a thickness of 20 μm or less, the electric field intensity in the photosensitive layer increases, and deterioration in charge due to charge injection from the base, that is, image defects called black spots are likely to occur. This phenomenon is significant when a charge generating material that is a p-type semiconductor and is likely to generate dark current, such as trigonal selenium or a phthalocyanine pigment, is used.

In contrast, when an n-type semiconductor such as a condensed-ring aromatic pigment, a perylene pigment, or an azo pigment is used as the charge generating material, dark current hardly occurs and the image defects called black spots can be reduced even with a thin film.

Whether the semiconductor is of n-type is determined by the polarity of a flowing photocurrent using a typical time-of-flight method, in which a material that allows electrons rather than holes to flow as a carrier is determined as an n-type semiconductor.

The binder resin used in the charge generating layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include polyvinyl butyral resins, polyarylate resins (e.g., polycondensates of bisphenols and aromatic dicarboxylic acids), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, caseins, polyvinyl alcohol resins, and polyvinyl pyrrolidone resins. The term "insulating" means that the volume resistivity is $10^{13}$ Ω cm or more.

These binder resins are used alone or as a mixture of two or more kinds thereof.

The blending ratio between the charge generating material and the binder resin is preferably 10:1 to 1:10 by mass.

The charge generating layer may further contain other known additives.

A method for forming the charge generation layer is not limited, and a known formation method is used. For example, a coating film of a coating solution for forming the charge generation layer, which is prepared by adding the components described above to a solvent, is formed, dried, and as necessary, heated. The charge generating layer may be formed by vapor deposition of the charge generating material. The formation of the charge generating layer by vapor deposition is suitable particularly when a condensed-ring aromatic pigment or a perylene pigment is used as the charge generating material.

Examples of the solvent for preparing the coating liquid for forming the charge generating layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents may be used alone or as a mixture of two or more kinds thereof.

Examples of the method for dispersing particles (e.g., the charge generating material) in the coating liquid for forming the charge generating layer include a media disperser such as a ball mill, a vibrating ball mill, an attritor, a sand mill, or a horizontal sand mill, and a medialess disperser such as a stirrer, an ultrasonic dispersing machine, a roll mill, or a high-pressure homogenizer. Examples of the high-pressure homogenizer include a collision-type high-pressure homogenizer in which dispersion is performed by liquid-liquid collision or liquid-wall collision of a dispersion liquid in a high-pressure state and a penetration-type high-pressure homogenizer in which dispersion is performed by causing a dispersion liquid to pass through a fine flow path in a high-pressure state.

The average particle diameter of the charge generating material in the coating solution for forming the charge generating layer effective for the dispersion is 0.5 μm or less, preferably 0.3 μm or less, and still more preferably 0.15 μm or less.

Examples of the method for applying the coating solution for forming the charge generating layer onto the undercoat layer (or the intermediate layer) include a typical method such as a blade coating method, a wire bar coating method, a spray coating method, a dip coating method, a ring coating method, a bead coating method, an air knife coating method, or a curtain coating method.

The film thickness of the charge generating layer is set, for example, preferably in the range of 0.1 μm or more and 5.0 μm or less, and more preferably in the range of 0.2 μm or more and 2.0 μm or less.

(Charge Transport Layer)

The charge transport layer is, for example, a layer containing a charge transport material and a binder resin. The charge transport layer may be a layer containing a polymer charge transport material.

Examples of the charge transport material include: quinone compounds such as p-benzoquinone, chloranil, bromanil, and anthraquinone; tetracyanoquinodimethane compounds; fluorenone compounds such as 2,4,7-trinitrofluorenone; xanthone compounds; benzophenone compounds; cyanovinyl compounds; and ethylene compounds. Examples of the charge transport material also include hole transporting compounds such as triarylamine compounds, benzidine compounds, aryl alkane compounds, aryl substituted ethylene compounds, stilbene compounds, anthracene compounds, and hydrazone compounds. These charge transport materials are used alone or in combination of two or more kinds thereof but are not limited to these materials.

As the charge transport material, a triarylamine charge transport material represented by a general formula (a-1) (hereinafter, also referred to as "triarylamine charge transport material (a-1)"), a charge transport material represented by a general formula (CT1) (hereinafter, also referred to as "butadiene charge transport material (CT1)") which is an example of a triarylamine charge transport material, and a charge transport material represented by a general formula (CT2) (hereinafter, also referred to as "benzidine charge transport material (CT2)") shown below are preferable from the viewpoint of charge mobility.

The butadiene charge transport material (CT1) and the benzidine charge transport material (CT2) may be used in combination as the charge transport material.

The triarylamine charge transport material (a-1) will be described.

The triarylamine charge transport material (a-1) is a charge transport material represented by the following general formula (a-1).

[Chemical Formula 1]

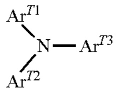

(a-1)

In the general formula (a-1), $Ar^{T1}$, $Ar^{T2}$, and $Ar^{T3}$ each independently represent a substituted or unsubstituted aryl group, $-C_6H_4-C(RT_4)=C(R^{T5})(R^{T6})$, or $-C_6H_4-CH=CH-CH=C(R^{T7})(R^{T8})$, $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group include a halogen atom, an alkyl group having 1 to 5 carbon atoms, and an alkoxy group having 1 to 5 carbon atoms. Examples of the substituent of each group also include a substituted amino group substituted with an alkyl group having 1 to 3 carbon atoms.

The butadiene charge transport material (CT1) will be described.

The butadiene charge transport material (CT1) is a charge transport material represented by the following general formula (CT1).

include a linear or branched alkyl group having 1 to 20 (preferably 1 to 6, more preferably 1 to 4) carbon atoms.

Specific examples of the linear alkyl group include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isoundecyl group, a sec-undecyl group, a tert-undecyl group, a neoundecyl group, an isododecyl group, a sec-dodecyl group, a tert-dodecyl group, a neododecyl group, an isotridecyl group, a sec-tridecyl group, a tert-tridecyl group, a neotridecyl group, an isotetradecyl group, a sec-tetradecyl group, a tert-tetradecyl group, a neotetradecyl group, a 1-isobutyl-4-ethyloctyl group, an isopentadecyl group, a sec-pentadecyl group, a tert-pentadecyl group, a neopentadecyl group, an isohexadecyl group, a sec-hexadecyl group, a tert-hexadecyl group, a neohexadecyl group, a 1-methylpentadecyl group, an isoheptadecyl group, a sec-heptadecyl group, a tert-heptadecyl group, a

[Chemical Formula 2]

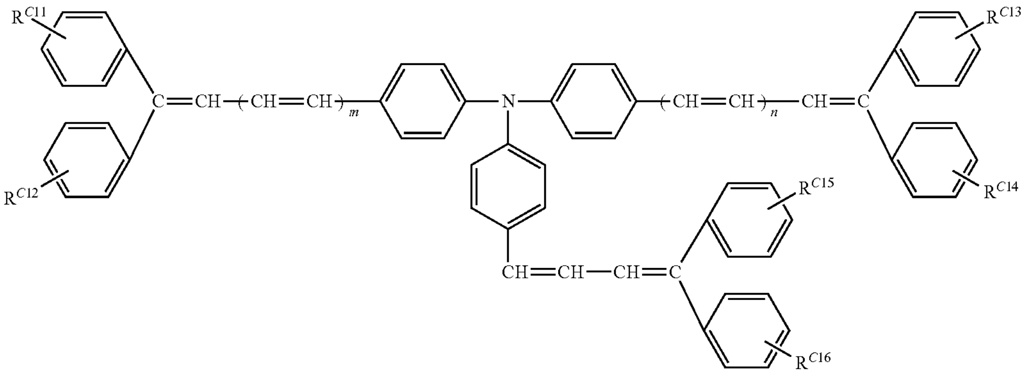

(CT1)

In the general formula (CT1), $R^{C11}$, $R^{C12}$, $R^{C13}$, $R^{C14}$, $R^{C15}$, and $R^{C16}$ each independently represent a hydrogen atom, a halogen atom, an alkyl group having 1 to 20 carbon atoms, an alkoxy group having 1 to 20 carbon atoms, or an aryl group having 6 to 30 carbon atoms, wherein two adjacent substituents may be bonded to each other to form a hydrocarbon ring structure.

Also, n and m each independently represent 0, 1, or 2.

Examples of the halogen atom represented by $R^{C11}$, $R^{C12}$, $R^{C13}$, $R^{C14}$, $R^{C15}$, or $R^{C16}$ in the general formula (CT1) include a fluorine atom, a chlorine atom, a bromine atom, and an iodine atom. Among them, as the halogen atom, a fluorine atom or a chlorine atom is preferable, and a chlorine atom is more preferable.

Examples of the alkyl group represented by $R^{C11}$, $R^{C12}$, $R^{C13}$, $R^{C14}$, $R^{C15}$, or $R^{C16}$ in the general formula (CT1)

neoheptadecyl group, an isooctadecyl group, a sec-octadecyl group, a tert-octadecyl group, a neooctadecyl group, an isononadecyl group, a sec-nonadecyl group, a tert-nonadecyl group, a neononadecyl group, a 1-methyloctyl group, an isoicosyl group, a sec-icosyl group, a tert-icosyl group, and a neoicosyl group.

Among them, a lower alkyl group such as a methyl group, an ethyl group, or an isopropyl group is preferable as the alkyl group.

Examples of the alkoxy group represented by $R^{C11}$, $R^{C12}$, $R^{C13}$, $R^{C14}$, $R^{C15}$, or $R^{C16}$ in the general formula (CT1) include a linear or branched alkoxy group having 1 to 20 (preferably 1 to 6, more preferably 1 to 4) carbon atoms.

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, a tert-decyloxy group, an isoundecyloxy group, a sec-undecyloxy group, a tert-undecyloxy group, a ncoundecyloxy group, an isododecyloxy group, a sec-dodecyloxy group, a tert-dodecyloxy group, a neododecyloxy group, an isotridecyloxy group, a sec-tridecyloxy group, a tert-tridecyloxy group, a neotridecyloxy group, an isotetradecyloxy group, a sec-tetradecyloxy group, a tert-tetradecyloxy group, a neotetradecyloxy group, a 1-isobutyl-4-ethyloctyloxy group, an isopentadecyloxy group, a sec-pentadecyloxy group, a tert-pentadecyloxy group, a neopentadecyloxy group, an isohexadecyloxy group, a sec-hexadecyloxy group, a tert-hexadecyloxy group, a neohexadecyloxy group, a 1-methylpentadecyloxy group, an isoheptadecyloxy group, a sec-heptadecyloxy group, a tert-heptadecyloxy group, a neoheptadecyloxy group, an isooctadecyloxy group, a sec-octadecyloxy group, a tert-octadecyloxy group, a neooctadecyloxy group, an isononadecyloxy group, a sec-nonadecyloxy group, a tert-nonadecyloxy group, a neonadecyloxy group, a 1-methyloctyloxy group, an isoicosyloxy group, a sec-icosyloxy group, a tert-icosyloxy group, and a ncoicosyloxy group.

Among them, a methoxy group is preferable as the alkoxy group.

Examples of the aryl group represented by $R^{C11}$, $R^{C12}$, $R^{C13}$, $R^{C14}$, $R^{C15}$, or $R^{C16}$ in the general formula (CT1) include an aryl group having 6 to 30 (preferably 6 to 20, more preferably 6 to 16) carbon atoms.

Specific examples of the aryl group include a phenyl group, a naphthyl group, a phenanthryl group, and a biphenylyl group.

Among them, a phenyl group or a naphthyl group is preferable as the aryl group.

Each substituent represented by $R^{C11}$, $R^{C12}$, $R^{C13}$, $R^{C14}$, $R^{C15}$, or $R^{C16}$ in the general formula (CT1) further includes a group having a substituent. Examples of the substituent include the atoms and groups exemplified above (for example, a halogen atom, an alkyl group, an alkoxy group, and an aryl group).

In the hydrocarbon ring structure in which two adjacent substituents of $R^{C11}$, $R^{C12}$, $R^{C13}$. $R^{C14}$, $R^{C15}$, and $R^{C16}$ (for example, $R^{C11}$ and $R^{C12}$, $R^{C13}$ and $R^{C14}$, and $R^{C15}$ and $R^{C16}$) are linked in the general formula (CT1), examples of the group that links the adjacent substituents include a single bond, a 2,2'-methylene group, a 2,2'-ethylene group, and a 2,2'-vinylene group, and among them, a single bond or a 2,2'-methylene group is preferable.

Specific examples of the hydrocarbon ring structure include a cycloalkane structure, a cycloalkene structure, and a cycloalkane polyene structure.

In the general formula (CT1), n and m are preferably 1.

In the general formula (CT1), from the viewpoint of forming a photosensitive layer (charge transport layer) having a high charge transport ability, it is preferable that $R^{C11}$, $R^{C12}$, $R^{C13}$, $R^{C14}$, $R^{C15}$, and $R^{C16}$ represent a hydrogen atom, an alkyl group having 1 to 20 carbon atoms, or an alkoxy group having 1 to 20 carbon atoms, and m and n represent 1 or 2, and it is more preferable that $R^{C11}$, $R^{C12}$, $R^{C13}$, $R^{C14}$, $R^{C15}$, and $R^{C16}$ represent a hydrogen atom, and m and n represent 1.

That is, the butadiene charge transport material (CT1) is more preferably a charge transport material (exemplary compound (CT1-3)) represented by the following structural formula (CTIA).

[Chemical Formula 3]

(CT1A)

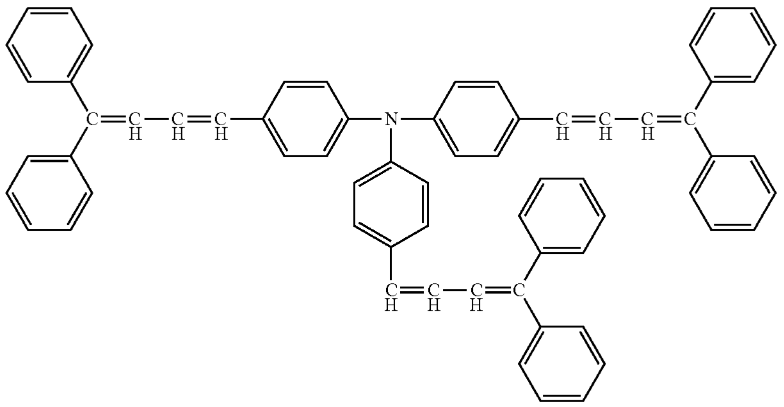

Specific examples of the butadiene charge transport material (CT1) are shown below, but the charge transport material is not limited to these examples.

[Chemical Formula 4]

| Exemplary compound No. | m | n | $R^{C11}$ | $R^{C12}$ | $R^{C13}$ | $R^{C14}$ | $P^{C15}$ | $R^{C16}$ |
|---|---|---|---|---|---|---|---|---|
| CT1-1 | 1 | 1 | 4-$CH_3$ | 4-$CH_3$ | 4-$CH_3$ | 4-$CH_3$ | H | H |
| CT1-2 | 2 | 2 | H | H | H | H | 4-$CH_3$ | 4-$CH_3$ |

-continued

| Exemplary compound No. | m | n | $R^{C11}$ | $R^{C12}$ | $R^{C13}$ | $R^{C14}$ | $P^{C15}$ | $R^{C16}$ |
|---|---|---|---|---|---|---|---|---|
| CTI-3 | 1 | 1 | H | H | H | H | H | H |
| CT1-4 | 2 | 2 | H | H | H | H | H | H |
| CT1-5 | 1 | 1 | 4-$CH_3$ | 4-$CH_3$ | 4-$CH_3$ | H | H | H |
| CT1-6 | 0 | 1 | H | H | H | H | H | H |
| CT1-7 | 0 | 1 | 4-$CH_3$ | 4-$CH_3$ | 4-$CH_3$ | 4-$CH_3$ | 4-$CH_3$ | 4-$CH_3$ |
| CT1-8 | 0 | 1 | 4-$CH_3$ | 4-$CH_3$ | H | H | 4-$CH_3$ | 4-$CH_3$ |
| CT1-9 | 0 | 1 | H | H | 4-$CH_3$ | 4-$CH_3$ | H | H |
| CT1-10 | 0 | 1 | H | H | 3-$CH_3$ | 3-$CH_3$ | H | H |
| CT1-11 | 0 | 1 | 4-$CH_3$ | H | H | H | 4-$CH_3$ | H |
| CT1-12 | 0 | 1 | 4-$OCH_3$ | H | H | H | 4-$OCH_3$ | H |
| CT1-13 | 0 | 1 | H | H | 4-$OCH_3$ | 4-$OCH_3$ | H | H |
| CT1-14 | 0 | 1 | 4-$OCH_3$ | H | 4-$OCH_3$ | H | 4-$OCH_3$ | 4-$OCH_3$ |
| CT1-15 | 0 | 1 | 3-$CH_3$ | H | 3-$CH_2$ | H | 3-$CH_3$ | H |
| CT1-16 | 1 | 1 | 4-$CH_3$ | 4-$CH_3$ | 4-$CH_3$ | 4-$CH_3$ | 4-$CH_3$ | 4-$CH_3$ |
| CT1-17 | 1 | 1 | 4-$CH_3$ | 4-$CH_3$ | H | H | 4-$CH_3$ | 4-$CH_3$ |
| CT1-18 | 1 | 1 | H | H | 4-$CH_3$ | 4-$CH_3$ | H | H |
| CT1-19 | 1 | 1 | H | H | 3-$CH_3$ | 3-$CH_3$ | H | H |
| CT1-20 | 1 | 1 | 4-$CH_3$ | H | H | H | 4-$CH_3$ | H |
| CT1-21 | 1 | 1 | 4-$OCH_3$ | H | H | H | 4-$OCH_3$ | H |
| CT1-22 | 1 | 1 | H | H | 4-$OCH_3$ | 4-$OCH_3$ | H | H |
| CT1-23 | 1 | 1 | 4-$OCH_3$ | H | 4-$OCH_3$ | H | 4-$OCH_3$ | 4-$OCH_3$ |
| CT1-24 | 1 | 1 | 3-$CH_3$ | H | 3-$CH_3$ | H | 3-$CH_3$ | H |

Abbreviations in the exemplary compounds have the following meanings, respectively. The numbers attached before the substituents indicate the substitution positions relative to the benzene ring.

$CH_3$: methyl group $OCH_3$: methoxy group

These butadiene charge transport materials (CT1) may be used alone or in combination of two or more thereof.

The benzidine charge transport material (CT2) will be described.

The benzidine charge transport material (CT2) is a charge transport material represented by the following general formula (CT2).

[Chemical Formula 5]

(CT2)

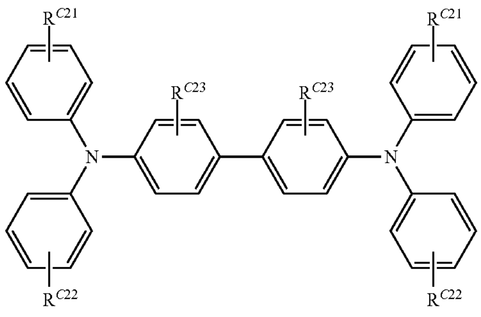

In the general formula (CT2), $R^{C21}$, $R^{C22}$, and $R^{C23}$ each independently represent a hydrogen atom, a halogen atom, an alkyl group having 1 to 10 carbon atoms, an alkoxy group having 1 to 10 carbon atoms, or an aryl group having 6 to 10 carbon atoms.

Examples of the halogen atom represented by $R^{C21}$, $R^{C22}$, or $R^{C23}$ in the general formula (CT2) include a fluorine atom, a chlorine atom, a bromine atom, and an iodine atom. Among them, as the halogen atom, a fluorine atom or a chlorine atom is preferable, and a chlorine atom is more preferable.

Examples of the alkyl group represented by $R^{C21}$, $R^{C22}$, or $R^{C23}$ in the general formula (CT2) include a linear or branched alkyl group having 1 to 10 (preferably 1 to 6, more preferably 1 to 4) carbon atoms.

Specific examples of the linear alkyl group include a methyl group, an ethyl group, an n-propyl group, an n-butyl group, an n-pentyl group, an n-hexyl group, an n-heptyl group, an n-octyl group, an n-nonyl group, and an n-decyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a see-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Among them, a lower alkyl group such as a methyl group, an ethyl group, or an isopropyl group is preferable as the alkyl group.

Examples of the alkoxy group represented by $R^{C21}$, $R^{C22}$, or $R^{C23}$ in the general formula (CT2) include a linear or branched alkoxy group having 1 to 10 (preferably 1 to 6, more preferably 1 to 4) carbon atoms.

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, and an n-decyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, and a tert-decyloxy group.

Among them, a methoxy group is preferable as the alkoxy group.

Examples of the aryl group represented by $R^{C21}$, $R^{C22}$, or $R^{C23}$ in the general formula (CT2) include an aryl group having 6 to 10 (preferably 6 to 9, more preferably 6 to 8) carbon atoms.

Specific examples of the aryl group include a phenyl group and a naphthyl group.

Among them, a phenyl group is preferable as the aryl group.

Each substituent represented by $R^{C21}$, $R^{C22}$, or $R^{C23}$ in the general formula (CT2) further includes a group having a substituent. Examples of the substituent include the atoms and groups exemplified above (for example, a halogen atom, an alkyl group, an alkoxy group, and an aryl group).

In the general formula (CT2), from the viewpoint of forming a photosensitive layer (charge transport layer) having a high charge transport ability, it is preferable that $R^{C21}$, $R^{C22}$, and $R^{C23}$ each independently represent a hydrogen atom or an alkyl group having 1 to 10 carbon atoms, and it is more preferable that $R^{C21}$, and $R^{C23}$ represent a hydrogen atom and $R^{C22}$ represent an alkyl group having 1 to 10 carbon atoms (in particular, a methyl group).

In particular, the benzidine charge transport material (CT2) is particularly preferably a charge transport material (exemplary compound (CT2-2)) represented by the following structural formula (CT2A).

[Chemical Formula 6]

(CT2A)

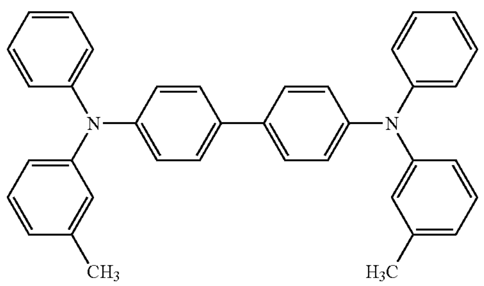

Specific examples of the benzidine charge transport materials (CT2) are shown below, but the charge transport material is not limited to these examples.

[Chemical Formula 7]

| Exemplary compound No. | $R^{C21}$ | $R^{C22}$ | $R^{C23}$ |
|---|---|---|---|
| CT2-1 | H | H | H |
| CT2-2 | H | 3-$CH_3$ | H |
| CT2-3 | H | 4-$CH_3$ | H |
| CT2-4 | H | 3-$C_2H_5$ | H |
| CT2-5 | H | 4-$C_2H_5$ | H |
| CT2-6 | H | 3-$OCH_3$ | H |
| CT2-7 | H | 4-$OCH_3$ | H |
| CT2-8 | H | 3-$OC_2H_5$ | H |
| CT2-9 | H | 4-$OC_2H_5$ | H |
| CT2-10 | 3-$CH_3$ | 3-$CH_3$ | H |
| CT2-11 | 4-$CH_3$ | 4-$CH_3$ | H |
| CT2-12 | 3-$C_2H_5$ | 3-$C_2H_5$ | H |
| CT2-13 | 4-$C_2H_5$ | 4-$C_2H_5$ | H |
| CT2-14 | H | H | 2-$CH_3$ |
| CT2-15 | H | H | 3-$CH_3$ |
| CT2-16 | H | 3-$CH_3$ | 2-$CH_3$ |
| CT2-17 | H | 3-$CH_3$ | 3-$CH_3$ |
| CT2-18 | H | 4-$CH_3$ | 2-$CH_3$ |
| CT2-19 | H | 4-$CH_3$ | 3-$CH_3$ |
| CT2-20 | 3-$CH_3$ | 3-$CH_3$ | 2-$CH_3$ |
| CT2-21 | 3-$CH_3$ | 3-$CH_3$ | 3-$CH_3$ |
| CT2-22 | 4-$CH_3$ | 4-$CH_3$ | 2-$CH_3$ |
| CT2-23 | 4-$CH_3$ | 4-$CH_3$ | 3-$CH_3$ |

Abbreviations in the exemplary compounds have the following meanings, respectively. The numbers attached before the substituents indicate the substitution positions relative to the benzene ring.

$CH_3$: methyl group $C_2H_5$: ethyl group $OCH_3$: methoxy group $OC_2H_5$: ethoxy group The benzidine charge transport material (CT2) may be used alone or in combination of two or more kinds thereof.

As the polymer charge transport material, a known material having a charge transport property such as poly-N-vinylcarbazole or polysilane is used. In particular, a polyester polymer charge transport material is preferable. The polymer charge transport material may be used alone or in combination with a binder resin.

Examples of the binder resin used in the charge transport layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazole, and polysilane. Among them, a polycarbonate resin or a polyarylate resin is suitable as the binder resin. These binder resins are used alone or in combination of two or more kinds thereof.

The blending ratio between the charge transport material and the binder resin is preferably 10:1 to 1:5 by mass.

The charge transport layer may contain other known additives.

A method for forming the charge transport layer is not limited, and a known formation method is used. For example, a coating film of a coating solution for forming the charge transport layer, which is prepared by adding the components described above to a solvent, is formed, dried, and as necessary, heated.

Examples of the solvent used for preparing the coating liquid for forming the charge transport layer include typical organic solvents such as: aromatic hydrocarbons, for example benzene, toluene, xylene, and chlorobenzene; ketones, for example acetone and 2-butanone; halogenated aliphatic hydrocarbons, for example methylene chloride, chloroform, and ethylene chloride; and cyclic or linear ethers, for example tetrahydrofuran and ethyl ether. These solvents are used alone or in combination of two or more kinds thereof.

Examples of the coating method for applying the coating liquid for forming the charge transport layer onto the charge generating layer include a typical method such as a blade coating method, a wire bar coating method, a spray coating method, a dip coating method, a ring coating method, a bead coating method, an air knife coating method, or a curtain coating method.

The film thickness of the charge transport layer is set, for example, preferably in the range of 5 μm or more and 50 μm or less, and more preferably in the range of 10 μm or more and 30 μm or less.

(Protective Layer)

The protective layer is provided on the photosensitive layer as necessary. The protective layer is provided, for example, for the purpose of preventing a chemical change of the photosensitive layer at the time of charging or further improving the mechanical strength of the photosensitive layer.

Thus, a layer composed of a cured film (crosslinked film) is preferably applied as the protective layer. Examples of these layers include layers shown in the following 1) or 2).

1) A layer formed of a cured film of a composition containing a reactive group-containing charge transport material having a reactive group and a charge transporting skeleton in the same molecule (that is, a layer containing a polymer or a crosslinked product of the reactive group-containing charge transport material).

2) A layer formed of a cured film of a composition containing a non-reactive charge transport material and a reactive group-containing non-charge transport material having a reactive group but not having a charge transporting skeleton (that is, a layer containing a non-reactive charge transport material and a polymer or crosslinked product of the reactive group-containing non-charge transport material).

Examples of the reactive group of the reactive group-containing charge transport material include known reactive groups such as a chain polymerizable group, an epoxy group, —OH, —OR (wherein R represents an alkyl group), —$NH_2$, —SH, —COOH, or —$SiR^{Q1}_{3-Qn}(OR^{Q2})_{Qn}$ (wherein $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3).

The chain polymerizable group is not limited as long as it is a functional group capable of radical polymerization, and is, for example, a functional group having a group containing at least a carbon double bond. Specific examples thereof include a group containing at least one selected from a vinyl group, a vinyl ether group, a vinyl thioether group, a vinyl phenyl group, an acryloyl group, a methacryloyl group, and derivatives thereof. In particular, the chain polymerizable group is preferably a group containing at least one selected from a vinyl group, a vinylphenyl group, an acryloyl group, a methacryloyl group, and derivatives thereof because of their good reactivity.

The charge transporting skeleton of the reactive group-containing charge transport material is not limited as long as it has a known structure in an electrophotographic photoreceptor, and examples thereof include a structure which is derived from a nitrogen-containing hole transporting compound such as a triarylamine compound, a benzidine compound, or a hydrazone compound and is conjugated with a nitrogen atom. Among them, a triarylamine skeleton is preferable.

The reactive group-containing charge transport material having a reactive group and a charge transporting skeleton, the non-reactive charge transport material, and the reactive group-containing non-charge transport material may be selected from known materials.

The protective layer may contain other known additives.

A method for forming the protective layer is not limited, and a known formation method is used. For example, a coating film of a coating solution for forming the protective layer, which is prepared by adding the components described above to a solvent, is formed, dried, and as necessary, subjected to a curing treatment such as heating.

Examples of the solvent for preparing the coating liquid for forming the protective layer include aromatic solvents such as toluene and xylene; ketone solvents such as methyl ethyl ketone, methyl isobutyl ketone, and cyclohexanone; ester solvents such as ethyl acetate and butyl acetate; ether solvents such as tetrahydrofuran and dioxane; cellosolve solvents such as ethylene glycol monomethyl ether; and alcohol solvents such as isopropyl alcohol and butanol. These solvents are used alone or in combination of two or more thereof.

The coating liquid for forming a protective layer may be a solventless coating liquid.

Examples of the method for applying the coating liquid for forming the protective layer onto the photosensitive layer (for example, the charge transport layer) include a typical method such as a dip coating method, a ring coating method, a push-up coating method, a wire bar coating method, a spray coating method, a blade coating method, a knife coating method, or a curtain coating method.

The film thickness of the protective layer is set, for example, preferably in the range of 1 μm or more and 20 μm or less, and more preferably in the range of 2 μm or more and 10 μm or less.

(Single-Layer Type Photosensitive Layer)

The single-layer type photosensitive layer (charge generating/charge transport layer) is a layer containing, for example, a charge generating material and a charge transport material, and as necessary, a binder resin and other known additives. These materials are the same as the materials described for the charge generating layer and the charge transport layer.

The content of the charge generating material in the single-layer type photosensitive layer may be 0.1 mass % or more and 10 mass % or less and is preferably 0.8 mass % or more and 5 mass % or less relative to the total solid content. The content of the charge transport material in the single-layer type photosensitive layer is preferably 5 mass % or more and 50 mass % or less relative to the total solid content.

The method for forming the single-layer type photosensitive layer is the same as the method for forming the charge generating layer or the charge transporting layer.

The film thickness of the single-layer type photosensitive layer may be, for example, 5 μm or more and 50 μm or less, and preferably 10 μm or more and 40 μm or less.

<Photoreceptor Unit>

A photoreceptor unit according to an exemplary embodiment includes the electrophotographic photoreceptor according to the exemplary embodiment (that is, the electrophotographic photoreceptor including the support according to the exemplary embodiment and a photosensitive layer), a flange having a fitting part to be fitted into an opening end of the electrophotographic photoreceptor, and a balance adjusting mechanism for adjusting the bias of the center of gravity of the electrophotographic photoreceptor.

The balance adjusting mechanism is preferably provided on at least either the flange or the support in the electrophotographic photoreceptor, or it may be provided on both the flange and the support from the viewpoint of effectively adjusting the bias of the center of gravity of the electrophotographic photoreceptor.

The photoreceptor unit according to the exemplary embodiment having the structure described above can form an image with reduced color unevenness.

Hereinafter, an example of the photoreceptor unit according to the exemplary embodiment will be described, but the photoreceptor unit is not limited to the example. Main parts illustrated in the drawings will be described, and the description of other parts will be omitted.

Figure 4:
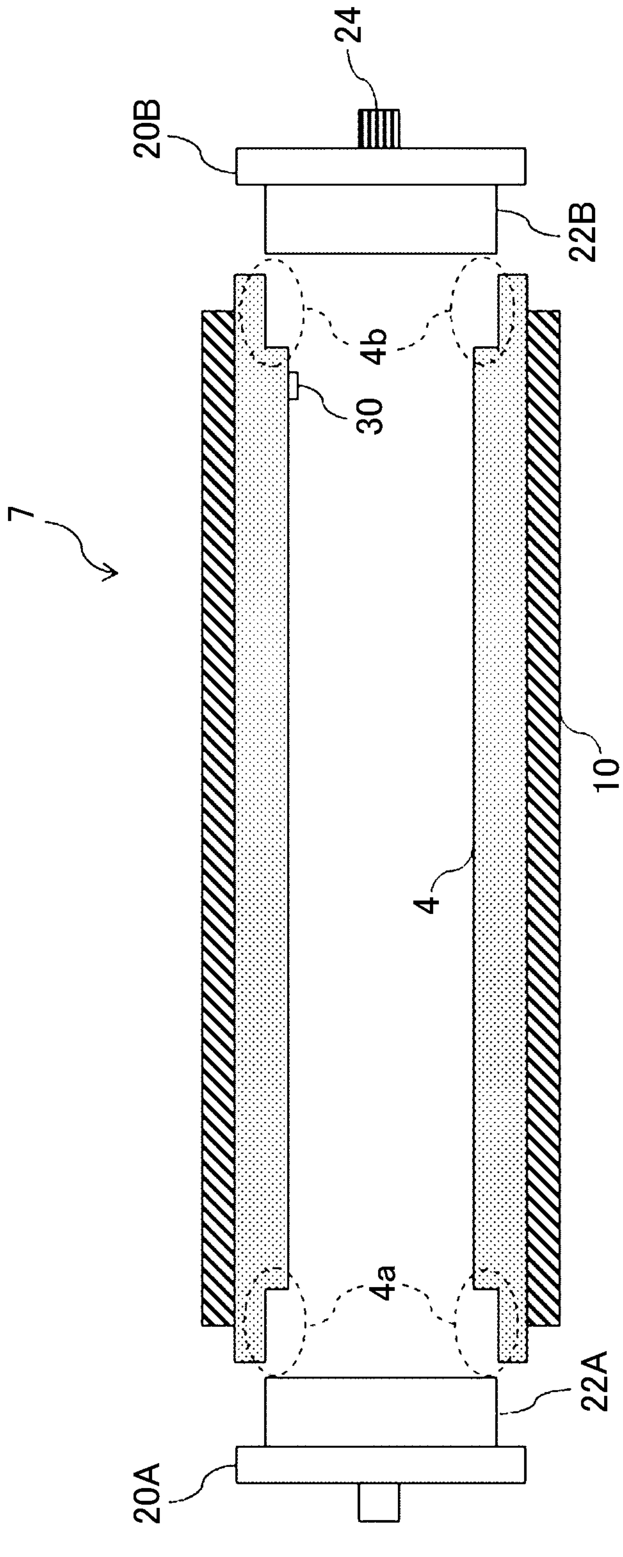
FIG. 4 is a schematic sectional view illustrating a configuration example of a photoconductor unit according to the exemplary embodiment.

FIG. 4 is a schematic sectional view illustrating a photoconductor unit according to the exemplary embodiment. As illustrated in FIG. 4, the photoreceptor unit according to the exemplary embodiment includes an electrophotographic photoreceptor 7, flanges 20A, 20B respectively having fitting parts 22A, 22B to be fitted into opening ends of the electrophotographic photoreceptor 7, and a weight (an example of the balance adjusting mechanism) 30 provided on the inner periphery of the conductive support 4 in the electrophotographic photoreceptor 7 to adjust the bias of the center of gravity of the electrophotographic photoreceptor 7. The electrophotographic photoreceptor 7 includes a photosensitive layer 10 formed on the conductive support 4.

The weight is used as the balance adjusting mechanism as described above. The material of the weight is not limited, and examples thereof include metals such as stainless steel and iron, and resins.

Specifically, as illustrated in FIG. 4, the inner periphery of one opening end (left end in FIG. 4) of the electrophotographic photoreceptor 7 is composed of the socket and spigot processed part (corresponding to the stepped part described above) 4*a* of the conductive support 4, and the fitting part 22A of the flange 20A is fitted to the socket and spigot processed part 4*a*. The inner periphery of the other opening end (right end in FIG. 4) of the electrophotographic photoreceptor 7 is composed of the socket and spigot processed part (corresponding to the stepped part) 4*b* of the conductive support 4, and the fitting part 22B of the flange 20B is fitted to the socket and spigot processed part 4*b*.

The flange 20B is provided with a gear member 24. The gear member 24 transmits a drive force for rotationally driving the electrophotographic photoreceptor 7, and a drive force generated from a drive device (not illustrated) such as a motor can be transmitted to the conductive support 4 via the gear member 24.

The both ends of the electrophotographic photoreceptor 7 (which are also both ends of the conductive support 4) are supported by the flanges 20A, 20B.

The weight 30 installed on the inner periphery of the conductive support 4 can adjust the bias of the center of gravity of the electrophotographic photoreceptor 7 by its weight (that is, mass), the installation position, the installation number, and the like.

Although FIG. 4 illustrates an example in which the weight 30 is provided on the inner periphery of the conductive support 4, the weight 30 may be provided on the flanges 20A, 20B, or on both the inner periphery of the conductive support 4 and the flanges 20A, 20B.

When the weight 30 is installed on the flanges 20A, 20B, the weight is preferably installed in a gap formed for the purpose of weight reduction of the flanges 20A, 20B.

The weight 30 may be installed on only one of the two flanges 20A, 20B.

A method for adjusting the bias of the center of gravity of the electrophotographic photoreceptor by the balance adjusting mechanism is as follows.

First, a flange is attached to the electrophotographic photoreceptor, and then a unit in which a bearing is attached to the flange is prepared. There is a method of simply adjusting the bias of the center of gravity of the electrophotographic photoreceptor by placing the obtained unit on a V block, and attaching, to at least either the flange or the support, a weight for adjusting the direction of the center of gravity of mass into an opposite phase that is rotated downward by the eccentric center of gravity.

There may also be applied a method of disposing a weight for adjusting the direction of the center of gravity of the mass at any place in which a drive shaft is attached to the flange as an inspection device, a vibration sensor is arranged relative to the drive shaft, an encoder capable of synchronizing with a signal from the vibration sensor is used on the drive shaft, and a sensor input signal and a phase angle are taken to perform calculation of a vibration amount and a phase angle by Fourier calculation or the like.

<Image Forming Apparatus and Process Cartridge>

An image forming apparatus according to an exemplary embodiment includes an electrophotographic photoreceptor, a charging unit that charges a surface of the electrophotographic photoreceptor, an electrostatic latent image forming unit that forms an electrostatic latent image on the charged surface of the electrophotographic photoreceptor, a developing unit that develops the electrostatic latent image formed on the surface of the electrophotographic photoreceptor with a developer containing toner to form a toner image, and a transfer unit that transfers the toner image onto a surface of a recording medium. The electrophotographic photoreceptor according to the exemplary embodiment is applied as the electrophotographic photoreceptor.

Examples of the image forming apparatus according to the exemplary embodiment include known image forming apparatuses such as: an apparatus including a fixing unit that fixes a toner image transferred to a surface of a recording medium; an apparatus a direct transfer type of directly transferring a toner image formed on a surface of an electrophotographic photoreceptor to a recording medium; an apparatus that employs an intermediate transfer type for primarily transferring a toner image formed on a surface of an electrophotographic photoreceptor to a surface of an intermediate transfer body, and secondarily transferring the toner image transferred to the surface of the intermediate transfer body to a surface of a recording medium; an apparatus including a cleaning unit that cleans the surface of an electrophotographic photoreceptor before charging after a toner image is transferred; an apparatus including a charge eliminating unit that irradiates the surface of an electrophotographic photoreceptor with charge eliminating light to eliminate charges before charging after a toner image is transferred; and an apparatus including an electrophotographic photoreceptor heating member for increasing the temperature of the electrophotographic photoreceptor and reducing the relative humidity.

In apparatus that employs an intermediate transfer type, the transfer unit may include, for example, an intermediate transfer body onto a surface of which a toner image is to be transferred, a primary transfer unit that primarily transfers the toner image formed on the surface of an electrophotographic photoreceptor onto the surface of the intermediate transfer body, and a secondary transfer unit that secondarily transfers the toner image transferred onto the surface of the intermediate transfer body onto a surface of a recording medium.

The image forming apparatus according to the exemplary embodiment may be either a dry development type image forming apparatus or a wet development type (a development type using a liquid developer) image forming apparatus.

In the image forming apparatus according to the exemplary embodiment, for example, a part including the electrophotographic photoreceptor may have a cartridge structure (process cartridge) detachably attached to the image forming apparatus. As the process cartridge, for example, a process cartridge including the electrophotographic photoreceptor of the exemplary embodiment, that is, the process cartridge of the exemplary embodiment is suitably used. The process cartridge may include, for example, at least one selected from the group consisting of a charging unit, an electrostatic latent image forming unit, a developing unit, and a transfer unit in addition to the electrophotographic photoreceptor.

Hereinafter, an example of the image forming apparatus according to the exemplary embodiment will be described, but the image forming apparatus is not limited to this example. Main parts illustrated in the drawings will be described, and the description of other parts will be omitted.

Figure 5:
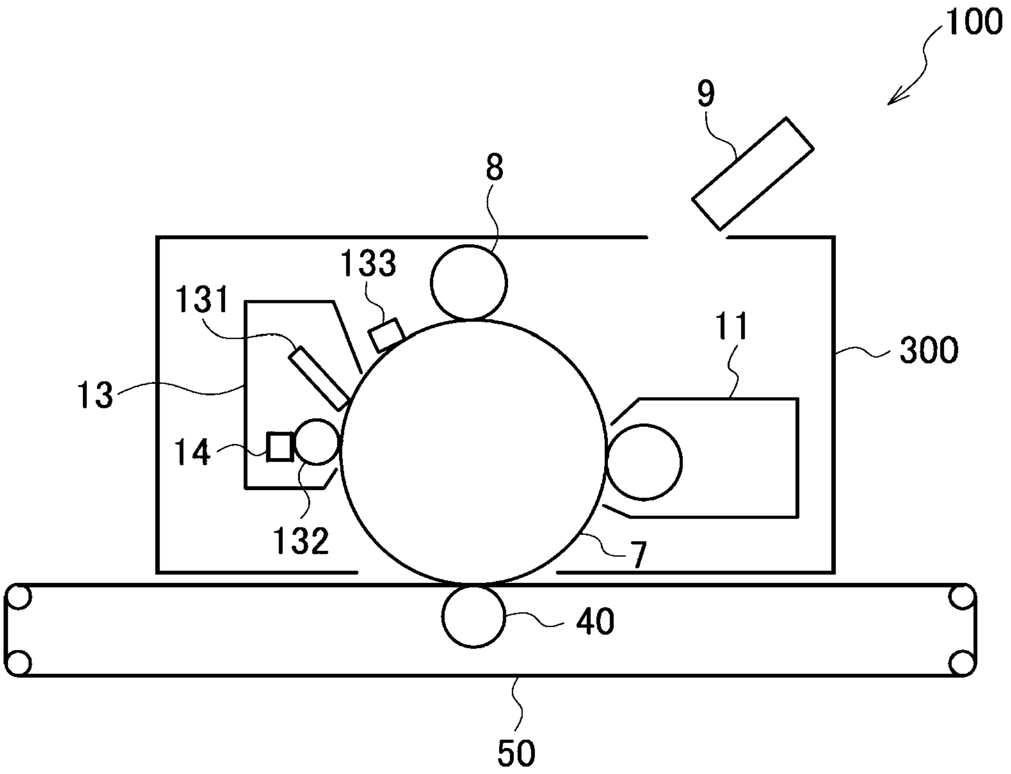
FIG. 5 is a schematic configuration diagram illustrating an example of an image forming apparatus according to the exemplary embodiment.

FIG. 5 is a schematic configuration diagram illustrating an example of the image forming apparatus according to the exemplary embodiment.

As illustrated in FIG. 5, an image forming apparatus 100 according to the exemplary embodiment includes a process cartridge 300 including the electrophotographic photoreceptor 7, an exposure device 9 (an example of the electrostatic latent image forming unit), a transfer device 40 (the primary transfer device), and an intermediate transfer body 50. In the image forming apparatus 100, the exposure device 9 is placed at a position where the electrophotographic photoreceptor 7 may be exposed through an opening of the process cartridge 300, the transfer device 40 is disposed at a position opposed to the electrophotographic photoreceptor 7 with the intermediate transfer body 50 interposed therebetween, and the intermediate transfer body 50 is disposed in a state in which part thereof is in contact with the electrophotographic photoreceptor 7. Although not illustrated, there is also a secondary transfer device that transfers the toner image transferred to the intermediate transfer body 50 onto a recording medium (for example, paper). The intermediate transfer body 50, the transfer device 40 (primary transfer device), and the secondary transfer device (not illustrated) correspond to an example of the transfer unit.

The process cartridge 300 illustrated in FIG. 5 integrally supports, in a housing, the electrophotographic photoreceptor 7, a charging device 8 (an example of the charging unit), a developing device 11 (an example of the developing unit), and a cleaning device 13 (an example of the cleaning unit). The cleaning device 13 includes a cleaning blade (an example of the cleaning member) 131, and the cleaning blade 131 is disposed to be in contact with the surface of the electrophotographic photoreceptor 7. The cleaning member is not limited to the form of the cleaning blade 131, and it may be a conductive or insulating fibrous member, which may be used alone or in combination with the cleaning blade 131.

FIG. 5 illustrates an example in which the image forming apparatus includes a fibrous member 132 (roll shape) that supplies a lubricant 14 to the surface of the electrophotographic photoreceptor 7 and a fibrous member 133 (flat brush shape) that assists in cleaning, but they are arranged as necessary.

Hereinafter, each component of the image forming apparatus according to the exemplary embodiment will be described.

—Charging Device—

As the charging device 8, for example, a contact type charger with a conductive or semiconductive charging roller, charging brush, charging film, charging rubber blade, charging tube, or the like is used. A known charger such as a non-contact type roller charger, or a scorotron charger or corotron charger using corona discharge is also used.

—Exposure Device—

Examples of the exposure device 9 include an optical system device that exposes in a predetermined image pattern the surface of the electrophotographic photoreceptor 7 to a light such as semiconductor laser a light, an LED light, or a liquid crystal shutter light. The wavelength of the light source is within the spectral sensitivity region of the electrophotographic photoreceptor. As the wavelength of the semiconductor laser, near infrared having an oscillation wavelength near 780 nm is mainly used. The wavelength is not limited to this, and a laser having an oscillation wavelength laser of 600 nm level or a laser having an oscillation wavelength of 400 nm or more and 450 nm or less as a blue laser may also be used. A surface-emitting laser light source capable of outputting multiple beams is also effective to form a color image.

—Developing Device—

Examples of the developing device 11 include a typical developing device that develops images by bringing a developer into contact with the developing device or without bringing the developer into contact with the developing device. The developing device 11 is not limited as long as it has the functions described above, and it is selected according to the purpose. Examples thereof include a known developing device having a function of attaching a one-component developer or a two-component developer to the electrophotographic photoreceptor 7 using a brush, a roller, or the like. In particular, a developing device including a developing roller that holds a developer on its surface is preferable.

The developer used in the developing device 11 may be a one-component developer containing only a toner or a two-component developer containing a toner and a carrier. The developer may be a magnetic or non-magnetic developer. Known developers may be used as such developers.

—Cleaning Device—

The cleaning device 13 is a cleaning blade device provided with the cleaning blade 131.

In addition to the cleaning blade type, a fur brush cleaning type or a type of cleaning simultaneously with development may be employed.

—Transfer Device—

Examples of the transfer device 40 include a known transfer charger such as a contact type transfer charger using a belt, a roller, a film, a rubber blade, or the like, or a scorotron charger or corotron charger utilizing corona discharge.

—Intermediate Transfer Body—

As the intermediate transfer body 50, a belt-shaped member (intermediate transfer belt) including polyimide, polyamideimide, polycarbonate, polyarylate, polyester, rubber, or the like to which semiconductivity is imparted is used. As the form of the intermediate transfer body, a drum-shaped intermediate transfer body may be used instead of a belt-shaped intermediate transfer body.

Figure 6:
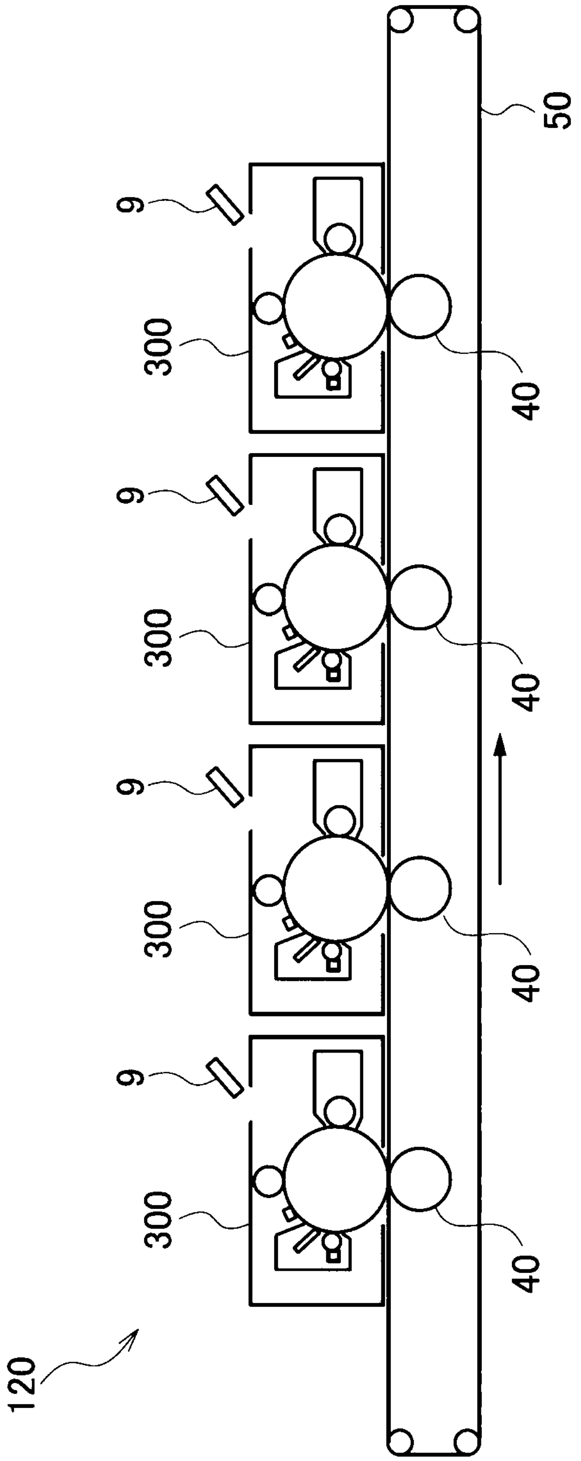
FIG. 6 is a schematic configuration diagram illustrating another example of the image forming apparatus according to the exemplary embodiment.

FIG. 6 is a schematic configuration diagram illustrating another example of the image forming apparatus according to the exemplary embodiment.

An image forming apparatus 120 illustrated in FIG. 6 is a multi-color image forming apparatus of a tandem type equipped with four process cartridges 300. According to a configuration of the image forming apparatus 120, the four process cartridges 300 are respectively arranged in parallel on the intermediate transfer body 50, and one electrophotographic photoreceptor is used for one color. The image forming apparatus 120 has the same configuration as the image forming apparatus 100, except that the image forming apparatus 120 is a tandem type.

The image forming apparatus according to the exemplary embodiment can achieve an increased output speed. The output speed, that is, the process speed may be, for example, 400 mm/s or more, and is preferably 500 mm/s or more and 700 mm/s or less.

EXAMPLES

Hereinafter, examples of the present invention will be described. The present invention is not limited to the following examples. Unless otherwise specified, “part(s)” means “part(s) by mass”.

<Production of Conductive Support>

Example 1

Production of Conductive Support (1)—

First, an aluminum alloy (JIS A 3003 alloy) solid is extruded with an extruder, and then the aluminum alloy extruded by the extruder is drawn with a drawing device, to form an aluminum tube material having an outer diameter of 160.6 mm, an entire length of 864 mm, and a thickness of 6.3 mm.

Next, both ends of the obtained tube material are subjected to socket and spigot process (boring cutting and end surface processing), the inner peripheral surface of the tube material is cut, and then the outer peripheral surface of the tube material is cut.

As described above, there is produced a conductive support (1) with a socket and spigot processed part which has an inner diameter of 150 mm, an outer diameter of 160 mm, a total length of 860 mm, and a thickness of 5 mm, and with a thickness of 6 mm at an inner side in an axial direction from the socket and spigot processed part.

The coaxiality C and the difference ΔC in coaxiality of the conductive support (1) are measured by the methods described above, and the results are shown in Table 1.

Examples 2 to 12, Comparative Examples 1, 2

—Production of Conductive Supports (2) to (14)—

A fixed position of a cutting tool and a work is adjusted with respect to a circumferential direction of an inner diameter of a tube material, and the work is subjected to socket and spigot process to produceconductive supports (2) to (14) each having a coaxiality C and a difference ΔC in coaxiality shown in Table 1.

<Production of Photoreceptor>

Electrophotographic photoreceptors (1) to (14) are obtained using the obtained conductive supports (1) to (14), respectively.

Specifically, an undercoat layer, a charge generating layer, a charge transport layer, and a protective layer are formed on each conductive support as follows.

(Formation of Undercoat Layer)

100 parts by mass of zinc oxide (product name: MZ300, manufactured by TAYCA CORPORATION) is stirred and mixed with 500 parts by mass of tetrahydrofuran, and 1.3 parts by mass of a silane coupling agent (KBM503: manufactured by Shin-Etsu Chemical Co., Ltd.) is added thereto, which is stirred for 2 hours. Thereafter, toluene is distilled off by distillation under reduced pressure, and baking is performed at 120° C. for 3 hours to obtain zinc oxide whose surface is treated with the silane coupling agent.

110 parts by mass of the zinc oxide whose surface was treated with the silane coupling agent is stirred and mixed with 500 parts by mass of tetrahydrofuran, a solution obtained by dissolving 0.6 parts by mass of alizarin in 50 parts by mass of tetrahydrofuran is added thereto, and the mixture is stirred at 50° C. for 5 hours. The zinc oxide to which alizarin is imparted is separated by filtration under reduced pressure and dried at 60° C. under reduced pressure to obtain alizarin-imparted zinc oxide.

38 parts by mass of a mixed solution was obtained by mixing 60 parts by mass of this alizarin-imparted zinc oxide, 13.5 parts by mass of a curing agent (blocked isocyanate SUMIDUR 3175, manufactured by Sumitomo Bayer Urethane Co., Ltd.), and 15 parts by mass of a butyral resin (S-LEC BM-1, manufactured by SEKISUI CHEMICAL CO., LTD.) with 85 parts by mass of methyl ethyl ketone, and the mixed solution and 25 parts by mass of methyl ethyl ketone are mixed, and the mixture is dispersed for 2 hours with a Sandoz mill using glass beads having a diameter of 1 mm to obtain a dispersion.

To the obtained dispersion, 0.005 parts by mass of dioctyltin dilaurate as a catalyst and 45 parts by mass of silicone resin particles (TOSPEARL 145, manufactured by Momentive Performance Materials Inc.) are added to obtain a coating liquid for forming an undercoat layer is obtained.

The coating liquid for forming an undercoat layer is applied onto each conductive support by dip coating method, wiped off at the inner surface of the lower end, and then dried and cured at 180° C. for 30 minutes, to obtain a 25 μm-thick undercoat layer.

(Formation of Charge Generating Layer)

A mixture of 15 parts by mass of hydroxygallium phthalocyanine having diffraction peaks at Bragg angles (2θ+) 0.2° of at least 7.3°, 16.0°, 24.9°, and 28.0° in an X-ray diffraction spectrum using a Cuka characteristic X-ray as a charge generating material, 10 parts by mass of a vinyl chloride-vinyl acetate copolymer (VMCH, manufactured by NUC Corporation) as a binder resin, and 200 parts by mass of n-butyl acetate is dispersed in a Sandoz mill for 4 hours using glass beads having a diameter of 1 mm. To the obtained dispersion, 175 parts by mass of n-butyl acetate and 180 parts by mass of methyl ethyl ketone are added and stirred, to obtained a coating liquid for forming a charge generating layer.

The coating liquid for forming a charge generating layer is applied on the undercoat layer by dip coating method and dried at 100° C. for 5 minutes to form a charge generating layer having a film thickness of 0.20 μm.

(Formation of Charge Transport Layer)

Next, 12 parts by mass of a charge transport material represented by the following structural formula (CT1A), 28 parts by mass of a charge transport material represented by the following structural formula (CT2A), and 60 parts by mass of a bisphenol Z-type polycarbonate resin (molecular weight: 40,000) are added to and dissolved in 340 parts by weight of tetrahydrofuran to obtain a coating liquid for forming a charge transport layer.

The obtained coating liquid for forming a charge transport layer is applied on the charge generating layer by dip coating method, and dried at 150° C. for 40 minutes to form a charge transport layer having a film thickness of 34 μm.

[Chemical Formula 8]

(CT1A)

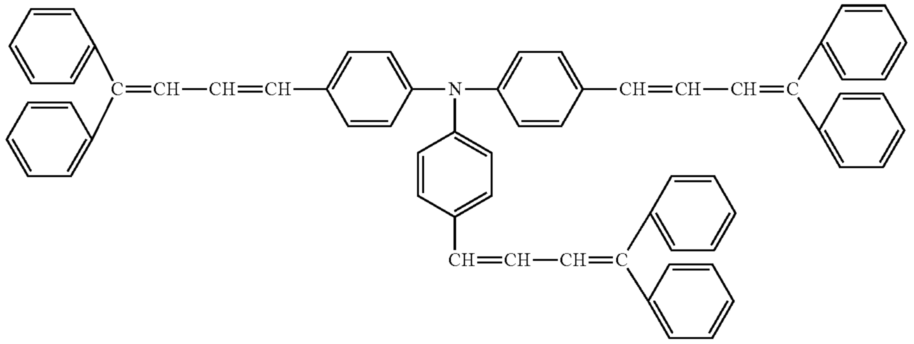

-continued

[ChemicaL Formula 9]

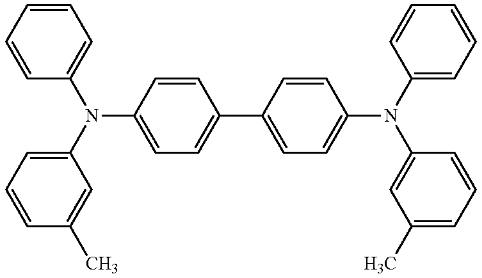

(CT2A)

(Formation of Protective Layer)

45 parts by mass of a reactive group-containing charge transport material represented by the following structural formula (1), 50 parts by mass of a reactive group-containing charge transport material represented by the following structural formula (2), and 4.8 parts by mass of a curable resin: benzoguanamine resin (Nikalac BL-60 manufactured by Sanwa Chemical Co., Ltd.) are mixed, and added with 0.2 parts by mass of NACURE 5225 (manufactured by King Industries, Inc.) as a curing catalyst, to be dissolved in 2-propanol, thereby obtaining a coating liquid for forming a protective layer. The coating liquid for forming a protective layer is applied to the charge transport layer by dip coating method, air-dried at room temperature (25° C.) for 30 minutes, and held at a heating temperature of 145° C. for a heating time (holding time of 600 minutes) for heat curing. A protective layer having a film thickness of 5 μm is thus formed.

[Chemical Formula 10]

Structural Formula (1)

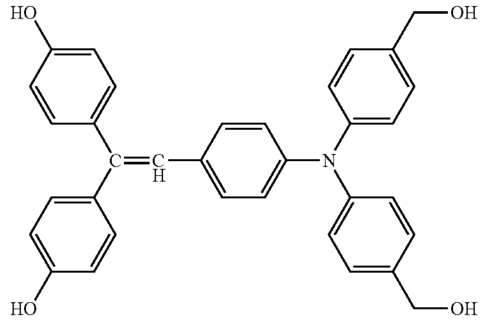

[Chemical Formula 11]

Structural Formula (2)

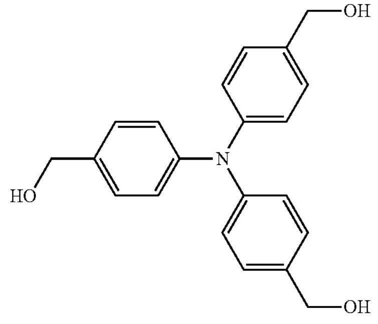

Electrophotographic photoreceptors (1) to (14) are obtained through the above steps.

Next, a flange is attached to each obtained electrophotographic photoreceptor as illustrated in FIG. 4, to produced photoreceptor units of Examples 1 to 12 and Comparative Examples 1 and 2.

In the photoreceptor units of Examples 11, 12, a weight is attached to either the inner periphery of the support or a gap of the flange in the electrophotographic photoreceptor to adjust the bias of the center of gravity of the electrophotographic photoreceptor.

<Evaluation>

(Evaluation of Color Unevenness)

Each of the obtained photoreceptor units is mounted on an electrophotographic image forming apparatus (a prototype apparatus manufactured by FUJIFILM Business Innovation Corp., the same applies hereinafter), a magenta full-surface halftone image having an image density of 40% is output on five sheets of B2 size paper, and the image on the third sheet is evaluated. The process speed is 570 mm/s.

Color unevenness is evaluated with the obtained image according to the following criteria.

An area of 515 mm×728 mm in the halftone image is divided into 40 areas of 20×20, and the image density at the central part of each area is measured using an image density meter (manufactured by X-rite, model number: X-rite 938), and the difference between the maximum value and the minimum value of the measured values is determined and taken as the image density difference. The results are shown in Table 1.

—Evaluation Criteria—

G1: The image density difference is 0.5 or less.

G2: The image density difference is more than 0.5 and 2.5 or less.

G3: Color unevenness is visually confirmed.

G4 Color unevenness is visually confirmed in a clear manner.

(Evaluation of Fine Line Misalignment)

Each of the obtained photoreceptor units is mounted on an electrophotographic image forming prototype apparatus, an image having 1 dot lines of the respective colors on the same axial line is output on three sheets of B2 size paper, and misalignment of the 1 dot lines between the respective colors is evaluated. The process speed is 570 mm/s. The results are shown in Table 1.

—Evaluation Criteria—

G1: Has a misalignment of the lines of 70 μm or less, which is no problem.

G2: Has a misalignment of the lines of more than 70 μm and less than 150 μm, which is no problem in practical use.

G3: Has a misalignment of the lines of 150 μm or more, resulting in color misalignment.

(Evaluation of Cleaning Properties)

Each of the obtained photoreceptor units is mounted on an electrophotographic image forming prototype apparatus, a toner image is formed on the photoreceptor so as to form a magenta image having an image density of 100% on B2 size paper, and two sheets are output in an untransferred state. Thereafter, the passing state of the toner and the external additive on the surface of the photoreceptor after passing through the cleaning blade is visually evaluated using a laser microscope. The process speed is 570 mm/s. The results are shown in Table 1.

—Evaluation Criteria—

G1: No passing through of the toner is observed.

G2: Although a very small amount of the toner and the external additive passed, there is no problem in practical use.

TABLE 1

| | Conductive support | Photoreceptor | Coaxiality $C_R$ [μm] | Coaxiality $C_L$ [μm] | Difference ΔC in coaxiality [μm] | Balance adjusting mechanism (installation position) | Color unevenness | Fine line misalignment | Cleaning property |
|---|---|---|---|---|---|---|---|---|---|
| Example 1 | (1) | (1) | 72.2 | 80.3 | 8.1 | None | G1 | G1 | G1 |
| Example 2 | (2) | (2) | 143.5 | 148.7 | 5.2 | None | G1 | G1 | G1 |
| Example 3 | (3) | (3) | 199.0 | 182.2 | 16.8 | None | G1 | G1 | G1 |
| Example 4 | (4) | (4) | 6.8 | 6.5 | 0.3 | None | G1 | G1 | G1 |
| Example 5 | (5) | (5) | 96.8 | 159.5 | 62.7 | None | G2 | G2 | G1 |
| Example 6 | (6) | (6) | 11.0 | 135.9 | 124.9 | None | G2 | G2 | G1 |
| Example 7 | (7) | (7) | 198.7 | 55.9 | 142.8 | None | G2 | G2 | G1 |
| Example 8 | (8) | (8) | 28.9 | 228.7 | 199.8 | None | G2 | G2 | G1 |
| Example 9 | (9) | (9) | 42.1 | 261.0 | 218.9 | None | G1 | G2 | G1 |
| Example 10 | (10) | (10) | 4.0 | 3.2 | 0.8 | None | G1 | G1 | G2 |
| Example 11 | (11) | (11) | 245.2 | 49.2 | 196.0 | Present (flange) | G1 | G1 | G1 |
| Example 12 | (12) | (12) | 60.1 | 252.1 | 192.0 | Present (inner periphery of support) | G1 | G1 | G1 |
| Comparative Example 1 | (13) | (13) | 301.1 | 149.3 | 151.8 | None | G3 | G3 | G1 |
| Comparative Example 2 | (14) | (14) | 305.3 | 101.1 | 204.2 | None | G4 | G3 | G1 |

From the above results, it can be seen that more image in which color unevenness and fine line misalignment are reduced can be obtained in the examples as compared with the comparative examples.

What is claimed is:

1. A support for an electrophotographic photoreceptor comprising:

a cylindrical body in which an inner diameter at each of both end parts in an axial direction is larger than an inner diameter at a central part in the axial direction and in which a stepped part is provided between the inner diameter at each of the both end parts in the axial direction and the inner diameter at the central part in the axial direction, wherein a coaxiality C between an outer diameter of the cylindrical body and the inner diameter at the central part in the axial direction is 0.3 mm or less.

2. The support for an electrophotographic photoreceptor according to claim 1, wherein the coaxiality C is 0.005 mm or more.

3. The support for an electrophotographic photoreceptor according to claim 1, wherein a difference ΔC in the coaxiality between both ends of the cylindrical body in the axial direction is 0.2 mm or less.

4. The support for an electrophotographic photoreceptor according to claim 3, wherein the coaxiality C is 0.2 mm or less, and the difference ΔC in the coaxiality is 0.05 mm or less.

5. The support for an electrophotographic photoreceptor according to claim 4, wherein the coaxiality C is 0.005 mm or more.

6. The support for an electrophotographic photoreceptor according to claim 1, wherein the cylindrical body has an outer diameter of 80 mm or more, a total length of 1,200 mm or less, and a thickness of 2 mm or more.

7. An electrophotographic photoreceptor comprising:

the support for an electrophotographic photoreceptor according to claim 1; and a photosensitive layer provided on the support for an electrophotographic photoreceptor.

8. The electrophotographic photoreceptor according to claim 7, wherein the coaxiality C is 0.005 mm or more.

9. The electrophotographic photoreceptor according to claim 7, wherein a difference ΔC in the coaxiality between both ends of the cylindrical body in the axial direction is 0.2 mm or less.

10. The electrophotographic photoreceptor according to claim 9, wherein the coaxiality C is 0.2 mm or less, and the difference ΔC in the coaxiality is 0.05 mm or less.

11. The electrophotographic photoreceptor according to claim 10, wherein the coaxiality C is 0.005 mm or more.

12. The electrophotographic photoreceptor according to claim 7, wherein the cylindrical body has an outer diameter of 80 mm or more, a total length of 1,200 mm or less, and a thickness of 2 mm or more.

13. A photoreceptor unit comprising:

the electrophotographic photoreceptor according to claim 7;

a flange having a fitting part to be fitted into an opening end of the electrophotographic photoreceptor; and a balance adjusting mechanism for adjusting a bias of a center of gravity of the electrophotographic photoreceptor.

14. The photoreceptor unit according to claim 13, wherein the balance adjusting mechanism is provided on at least either the flange or the support for an electrophotographic photoreceptor in the electrophotographic photoreceptor.

15. A process cartridge detachably attachable to an image forming apparatus, the process cartridge comprising the photoreceptor unit according to claim 13.

16. An image forming apparatus comprising:

the photoreceptor unit according to claim 13;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing toner to form a toner image; and a transfer unit that transfers the toner image onto a surface of a recording medium.

17. A process cartridge detachably attachable to an image forming apparatus, the process cartridge comprising the electrophotographic photoreceptor according to claim 7.

18. An image forming apparatus comprising:

the electrophotographic photoreceptor according to claim 7;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing toner to form a toner image; and a transfer unit that transfers the toner image onto a surface of a recording medium.

* * * * *